(12) United States Patent
Blom et al.

(10) Patent No.: US 9,946,887 B2
(45) Date of Patent: Apr. 17, 2018

(54) METHOD AND APPARATUS FOR DETERMINING PRIVACY POLICY BASED ON DATA AND ASSOCIATED VALUES

(75) Inventors: Jan Otto Blom, Lutry (CH); Julian Charles Nolan, Pully (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 184 days.

(21) Appl. No.: 13/487,787

(22) Filed: Jun. 4, 2012

(65) Prior Publication Data

US 2013/0326578 A1 Dec. 5, 2013

(51) Int. Cl.
*H04L 29/06* (2006.01)
*G06F 21/62* (2013.01)

(52) U.S. Cl.
CPC .......... *G06F 21/6218* (2013.01); *H04L 63/20* (2013.01); *G06F 2221/2111* (2013.01)

(58) Field of Classification Search
USPC ........................................................ 726/1
See application file for complete search history.

(56) References Cited

U.S. PATENT DOCUMENTS

| | | | |
|---|---|---|---|
| 6,200,765 B1 | 3/2001 | Murphy et al. | |
| 7,292,956 B1 * | 11/2007 | Guday et al. | 702/118 |
| 8,646,032 B2 | 2/2014 | Aad et al. | |
| 2003/0068828 A1 * | 4/2003 | Dadala | B01J 19/008 436/161 |
| 2004/0078219 A1 * | 4/2004 | Kaylor et al. | 705/2 |
| 2004/0267410 A1 | 12/2004 | Dun et al. | |
| 2005/0060561 A1 | 3/2005 | Pearson et al. | |
| 2005/0014485 A1 | 6/2005 | Kokkonen et al. | |
| 2006/0135177 A1 | 6/2006 | Winterbottom et al. | |
| 2007/0067626 A1 | 3/2007 | Louis Briancon et al. | |
| 2007/0107043 A1 * | 5/2007 | Newstadt et al. | 726/2 |
| 2007/0143851 A1 | 6/2007 | Nicodemus et al. | |
| 2008/0293430 A1 | 11/2008 | Blom et al. | |
| 2010/0146583 A1 | 6/2010 | Prehofer et al. | |
| 2011/0093249 A1 * | 4/2011 | Holmes | G06F 19/3493 703/6 |
| 2012/0166132 A1 | 6/2012 | Blom et al. | |
| 2013/0132330 A1 * | 5/2013 | Hurwitz et al. | 706/52 |

FOREIGN PATENT DOCUMENTS

| | | |
|---|---|---|
| WO | WO 01/20027 A1 | 3/2001 |
| WO | WO 01/20333 A1 | 3/2001 |
| WO | WO 03/048998 A2 | 6/2003 |
| WO | WO 2010/115457 A1 | 10/2010 |

* cited by examiner

*Primary Examiner* — Jason C Chiang
(74) *Attorney, Agent, or Firm* — Alston & Bird LLP

(57) ABSTRACT

A method includes determining at least one value for at least one instance of data; determining at least one privacy policy, at least one security policy, or a combination thereof based, at least in part, on the at least one value; and causing, at least in part, an application of the at least one privacy policy, the at least one security policy, or a combination thereof with respect to the at least one instance of data.

20 Claims, 13 Drawing Sheets

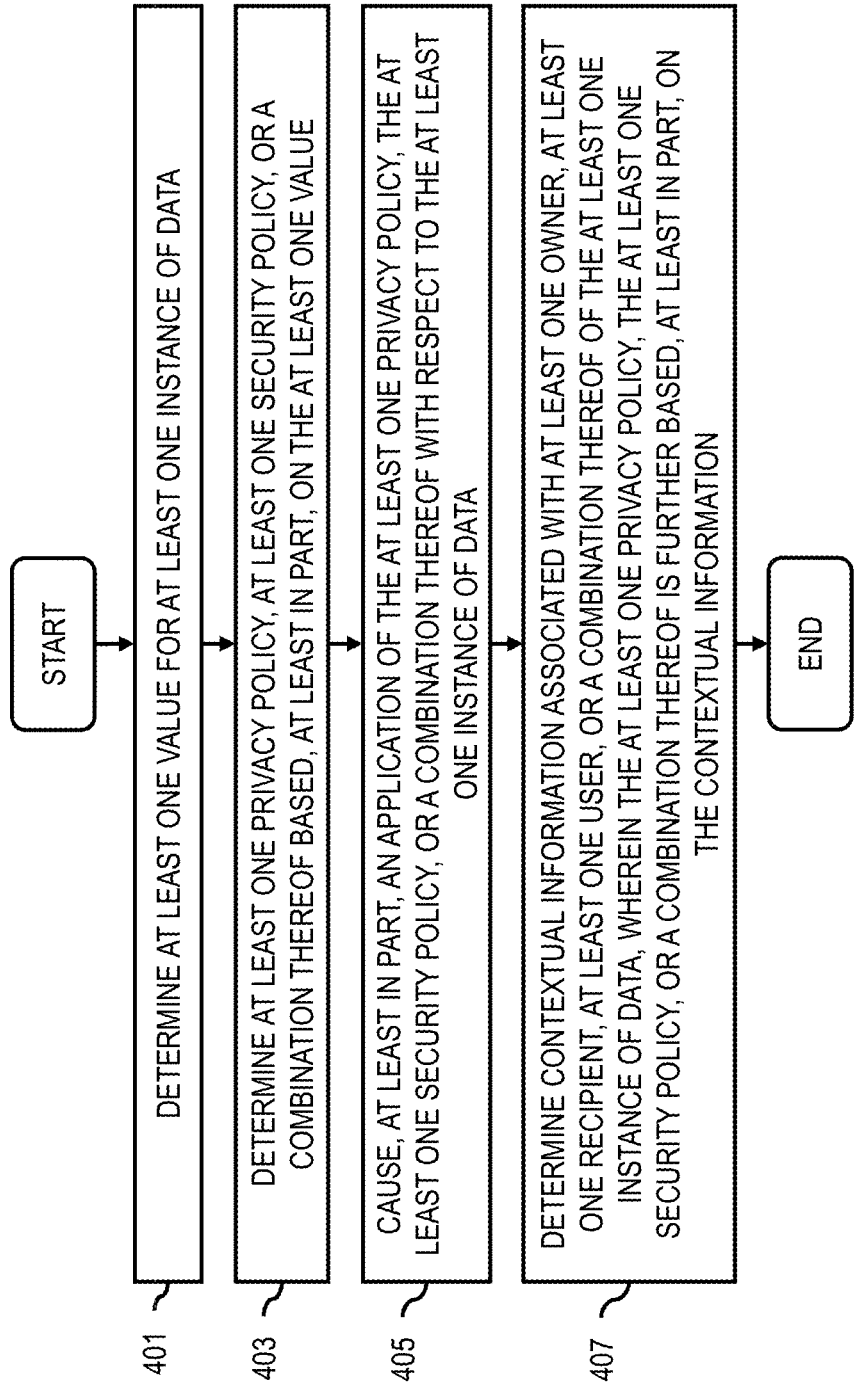

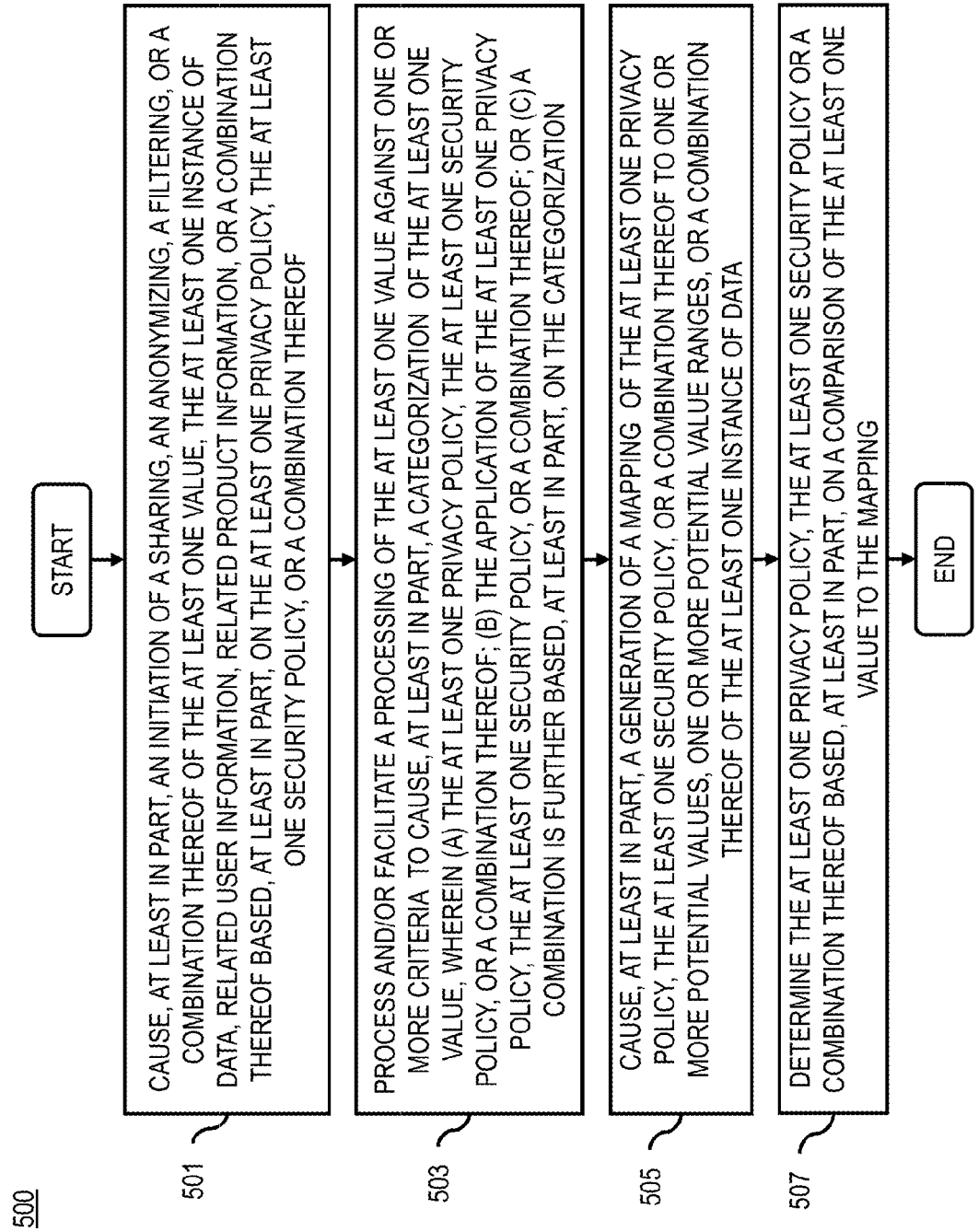

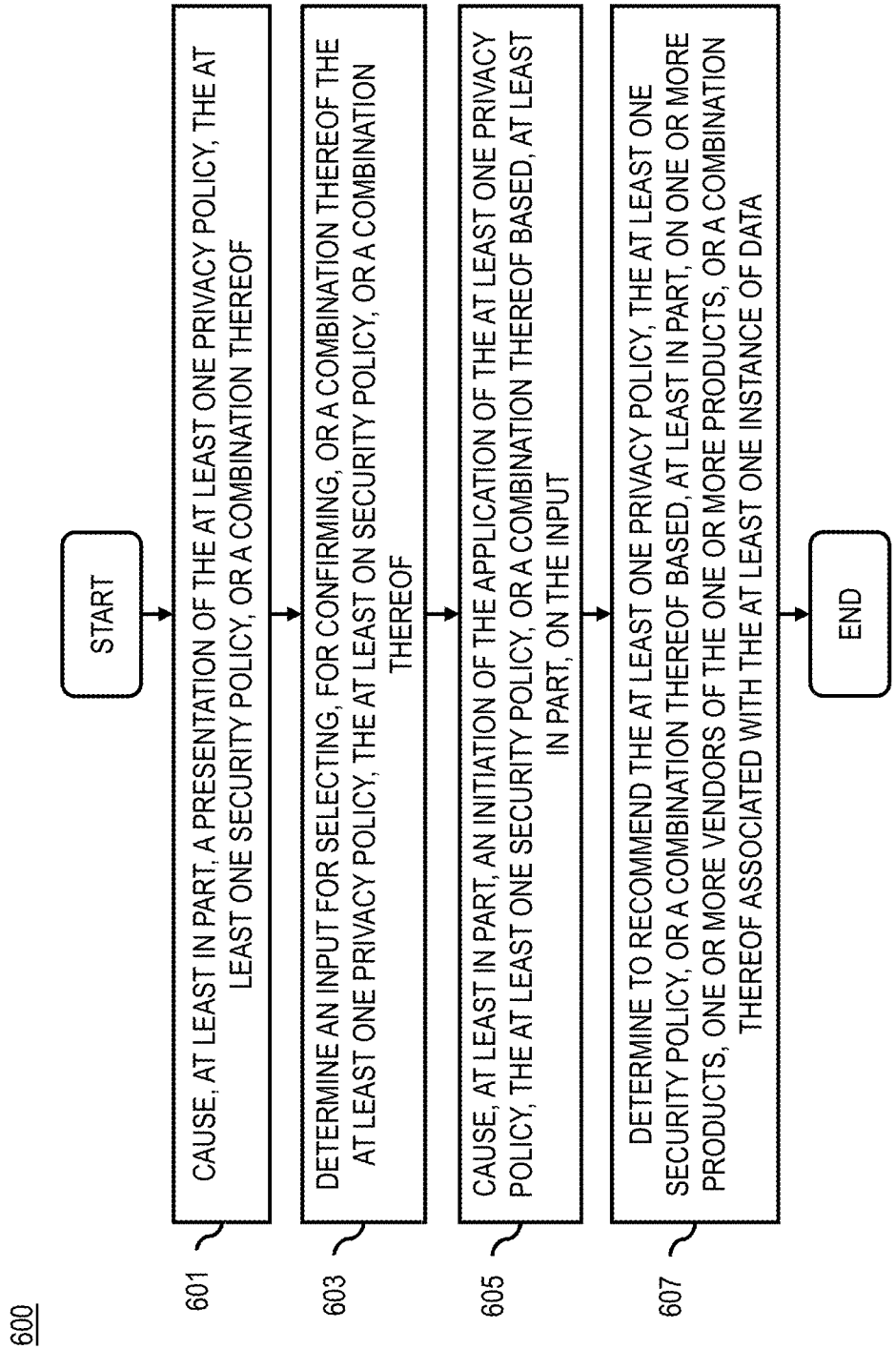

| Privacy/Security | User Input Conditions | | Output privacy policy |
|---|---|---|---|
| | 703 | 705 | 707 |
| Policy 1 – "normal" | Location = at home | Efficacy as expected | Update social networking status and drug manufacturer |
| Policy 2 – "normal" | Location = hospital | Efficacy as expected | Update social networking status, share with medical staff within hospital and drug manufacturer |
| Policy 3 – "low" | Location = at home | Efficacy < expected | Share with pre-authorized medical staff present at local clinic and drug manufacturer |

| Privacy/Security 701 | User Input Conditions 703 / 751 | | 705 | Output privacy policy 707 |
|---|---|---|---|---|
| Policy 1 – "positive" | Location = at home | No anonymity control | Efficacy as expected | Update social networking status for friends, update the product manufacturer |
| Policy 2 – "negative" | Location = at home | No anonymity control | Efficacy < expected | Update the product manufacturer only |
| Policy 3 – "positive" | Location = at a social network check-in point | No anonymity control | Efficacy as expected | Update social networking status for friends, update the product manufacturer, update other users with an interest in the product who are at the check-in point |
| Policy 4 – "positive" | Location = at home | No anonymity control | Efficacy as expected | Update social networking community of users with a shared interest (using own identity), update the product manufacturer |
| Policy 5 – "negative" | Location = at home | Anonymity control | Efficacy < expected | Update social networking community of users with a shared interest status (using a pseudonym), update the product manufacturer |

753
755
757
759
761

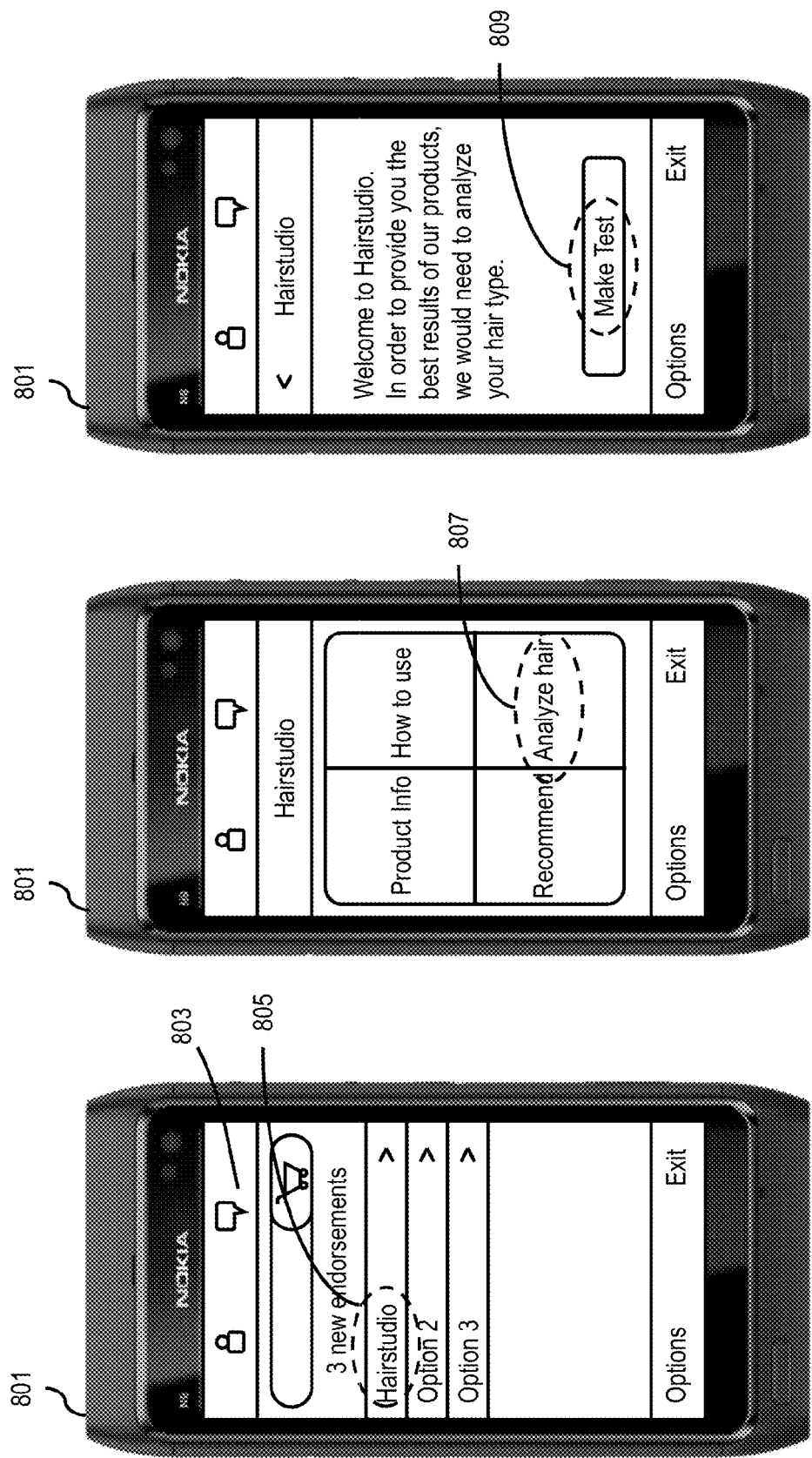

METHOD AND APPARATUS FOR DETERMINING PRIVACY POLICY BASED ON DATA AND ASSOCIATED VALUES

BACKGROUND

Device manufacturers and service providers are continually challenged to provide compelling services and applications to consumers. Additionally, various consumer product manufacturers are challenged to provide consumers with valuable products that work effectively, and to build brand loyalty with the consumers. Historically, consumers have had to largely rely on the manufacturers' promise that their products will perform as promised, but with new user devices (e.g., mobile devices) incorporating various sensors, it is possible (e.g., for users) to utilize these devices to perform various diagnostics and analysis on various products to better understand efficacy of such products. However, data and value associated with the users, the diagnostics, and the analysis potentially may be shared with various entities such as manufacturers, service providers, friends, family, etc., wherein the data may include various confidential information (e.g., related to the users, manufacturers, products, etc.). Accordingly, device manufacturers and service providers face significant technical challenges to protecting confidential information from being inappropriately disclosed.

SOME EXAMPLE EMBODIMENTS

Therefore, there is a need for an approach for determining and applying privacy and/or security policies based on data and value.

According to one embodiment, a method comprises determining at least one value for at least one instance of data. The method also comprises determining at least one privacy policy, at least one security policy, or a combination thereof based, at least in part, on the at least one value. The method further comprises causing, at least in part, an application of the at least one privacy policy, the at least one security policy, or a combination thereof with respect to the at least one instance of data.

According to another embodiment, an apparatus comprises at least one processor and at least one memory including computer program code for one or more programs, the at least one memory and the computer program code configured to, with the at least one processor, cause the apparatus to determine at least one value for at least one instance of data. The apparatus is also caused to determine at least one privacy policy, at least one security policy, or a combination thereof based, at least in part, on the at least one value. The apparatus is further caused to cause, at least in part, an application of the at least one privacy policy, the at least one security policy, or a combination thereof with respect to the at least one instance of data.

According to another embodiment, a computer-readable storage medium carries one or more sequences of one or more instructions which, when executed by one or more processors, cause, at least in part, an apparatus to apparatus to determine at least one value for at least one instance of data. The apparatus is also caused to determine at least one privacy policy, at least one security policy, or a combination thereof based, at least in part, on the at least one value. The apparatus is further caused to cause, at least in part, an application of the at least one privacy policy, the at least one security policy, or a combination thereof with respect to the at least one instance of data.

According to another embodiment, an apparatus comprises means for determining at least one value for at least one instance of data. The apparatus also comprises means for determining at least one privacy policy, at least one security policy, or a combination thereof based, at least in part, on the at least one value. The apparatus further comprises means for causing, at least in part, an application of the at least one privacy policy, the at least one security policy, or a combination thereof with respect to the at least one instance of data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method as disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for determining an instance of data, value, privacy, and security policies for application to the instance of data and/or value, according to an embodiment;

FIG. 5 is a flowchart of a process for categorizing, filtering, anonymizing, and sharing of an instance of a data and/or value, according to an embodiment;

FIG. 6 is a flowchart of a process for presentation and recommendation of a privacy and/or a security policy and determining a selection and/or a confirmation, according to an embodiment;

FIGS. 7A-7B illustrate example mappings of privacy and security policies to an instance of data and/or values, according to various embodiments;

FIGS. 8A-8F depict a mobile device having a user interface that can be used to help gather data in a process for providing a result of a determination regarding efficacy of a product, according to an embodiment;

DESCRIPTION OF SOME EMBODIMENTS

Examples of a method, apparatus, and computer program for determining and applying privacy and/or security policies based on data and value. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein the term "data" refers to any information associated with one or more parties such as users, products, manufacturers, service providers, diagnostics, tests, analysis, processes, results, etc. that may be shared with one or more other parties. Further, value or associated value are related to the data, for example, a range, pass, fail, good, bad, etc., which may indicate a threshold associated with the data and value. Although various embodiments are discussed with respect to determining and applying one or more privacy and/or security policies to the data and value, it is contemplated that the embodiments of the determining and applying processes described herein are also applicable to any data and value that may be subject to confidentiality, privacy, security, and the like policies.

Figure 1:
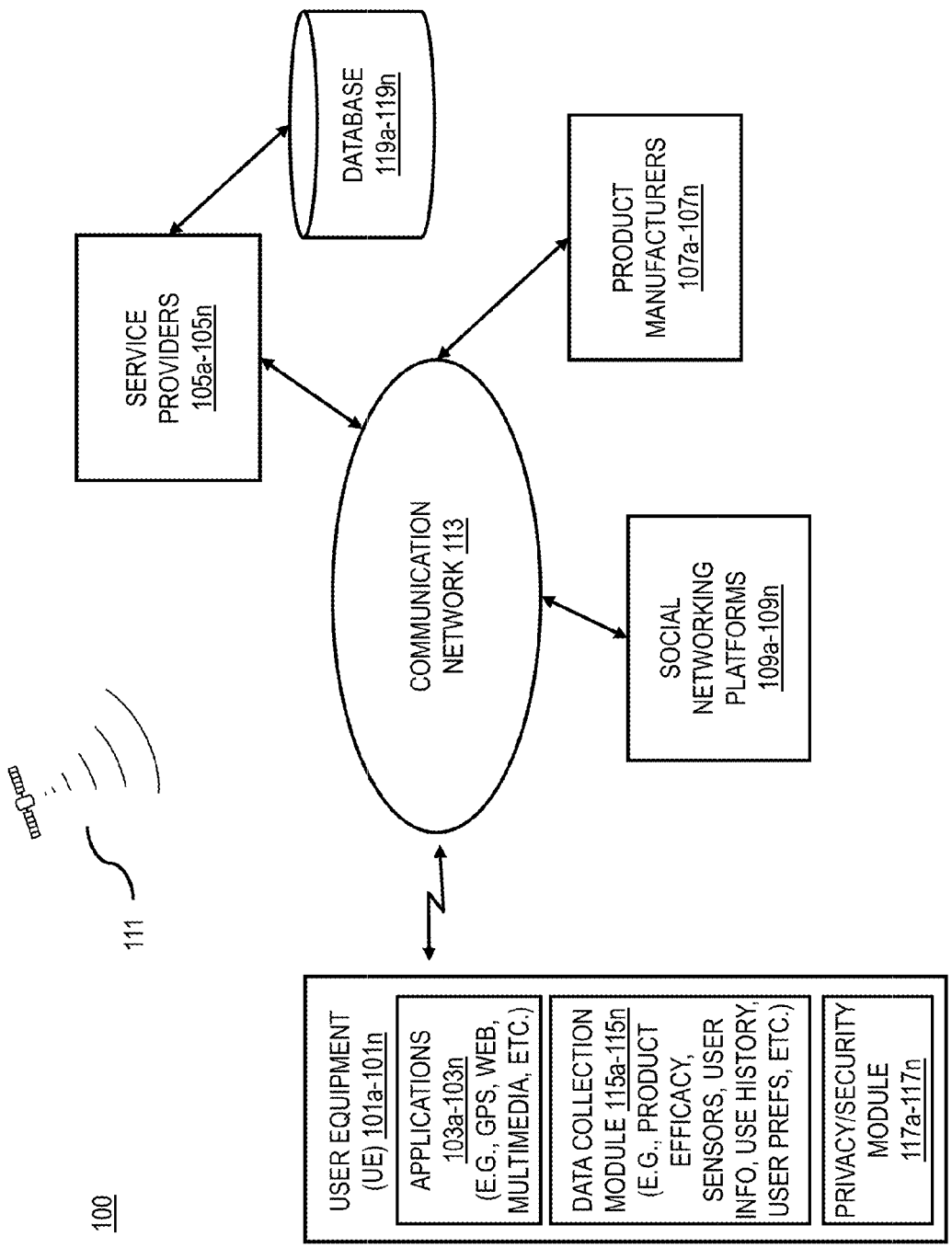
FIG. 1 is a diagram of a system capable of determining and applying privacy and/or security policies based on data and value, according to an embodiment.

FIG. 1 is a diagram of a system capable of determining and applying privacy and/or security policies based on data and value, according to an embodiment. As consumers/users and businesses generate, collect, and share various sensitive and important data/information, it is essential to protect privacy and security of the data and value. In many instances, the data and value may include sensitive personal and/or confidential information associated with a user (e.g., medical tests and results, family information, credit card information, etc.), which the user may wish not to share with others (e.g., individuals, businesses, service providers, social network, etc.) and/or may wish to control the sharing based on a type of the data, value, and other associated parameters (e.g., location, result information, etc.) For example, a user may wish not to share the results (e.g., associated value, pass, fail, good, bad, etc.) of a medical test with anyone except with the user's medical professional; however, the user may be willing to share the results and/or information about the medical test if the information and/or the results are positive, or if they can convey a positive message (e.g., normal blood pressure), or the user identity can be protected (e.g., anonymous), and the like. In another example, a user may wish to test efficacy of a certain product (e.g., a heart medication) and share the test results with the product's manufacturer, close friends, certain user groups, but not all social networking contacts (e.g., the user doesn't want general public to know about a possible health issue). In various situations, a user may manually check the data and value for determining a privacy policy and/or a security policy, or the user may agree to a service provider's privacy/security policy. However, with various data, associated parameters and values, and related potential sharing risks, it can be impractical for a user to check each instance of a data, value, and/or the service provider's privacy/security policies.

To address, at least these problems, a system 100 of FIG. 1 introduces the capability for determining and applying privacy and/or security policies based on data and value. More specifically, the system 100 supports users in determining and applying privacy and security policies to an instance of data and value based on data type, values, other related parameters and criteria. With technological advances in user equipment (e.g., mobile devices), users may utilize various user equipment to generate, collect, and share various data and values, wherein the user equipment may include and utilize various sensors as well as interface with other devices to analyze and collect data related to a user, to the user environment, user location, products and services utilized by the user, and the like. For example, mobile devices can be advantageously used to provide diagnostic information and analysis for various products (e.g., household, health, beauty, auto, etc.) and services (e.g., medical exam, IQ test, aptitude test, college test, etc.) to better understand the efficacy of such products and services, whereby the efficacy information may also be useful to other users, to the product manufacturers, and to service providers for improving quality of product and services. However, the data and values generated and collected from such diagnostics and analysis may include confidential information associated with users, products, services, manufacturers, service providers, etc., which may be shared only under certain rules, conditions, criteria, requirements, and the like. In various embodiments, the system 100 can process/analyze the data and its values for determining and applying appropriate privacy and security policies to the data and values. In other words, the system 100 can facilitate determination and substantially automated and/or manual application of the privacy and/or security policies to an instance of data and values based, on the data type, the values, user information, recipient information, and other criteria defined by the user, by a service provider, and/or other entities associated with the data and/or the value. In one embodiment, the privacy and/or security policies are based on the value, location of the user, location of the recipient of the value, or a combination thereof.

In one embodiment, system 100 substantially automatically determines and recommends a privacy and/or a security policy, wherein one or more data and value parameters are defined by the user. In various settings, different groups of products relate to different levels of personal sensitivity, for example, specific treatments for the cardiovascular system are likely to be less personally sensitive than treatments for the brain, nervous system, infectious diseases, and the like. Similarly, FMCG products may be classified—ranging from types of shaving products (which could be deemed not personal) through to types of anti-aging cream which may be deemed more personal. Different classes of products are not only used to determine how personal the associated diagnostic information is, but also to determine additional privacy settings. For example, pharmaceuticals vs. typical FMCG products, wherein this information may be helpful in determining how diagnostic data and values are classified, shared, utilized, and the like. Further, in certain situations sharing recipient parties may be determined from the classification information, for example, it may not be necessary to share with a doctor or a hospital the data and values associated with a typical FMCG product, but the user may wish to share it with other users via a social networking platform. Likewise, the user may want to share diagnostic data relating to cardiovascular drugs with a doctor and perhaps a hospital, but not with friends on the social networking platform. In various embodiments, the data and values may be shared anonymously based on the data and value. For example, in the case of a lower than expected efficacy, the user can communicate with a community of likeminded consumers under a pseudonym. However, in case of expected level of efficacy, then there should be fewer issues with privacy and hence the user may be encouraged to communicate about the data and value using, for example, user's social networking platform. In various embodiments, location of a user, an instance of data, and value may be utilized in determining a privacy and security policy. For example, if the user is in a hospital location, then data and value of diagnostic information should be shared with hospital staff in that same location. In various embodiments, the one or more suggested privacy and security settings are presented to a user for selection and/or confirmation, wherein the selected settings may be utilized under similar conditions of data, value, and/or location.

In one embodiment, the system 100 can determine and recommend the privacy and security policies to a user or an entity associated with the data. In various embodiments, the privacy and security policies may be based on various parameters, for example, the user, the user location, the data type, values associated with the data, recipient of the data and/or the values, entity/person causing the data generation, and the like. In various embodiments, one or more user equipment may generate, collect, process, and/or provide the data and the value to one or more other equipment (e.g., user equipment, a server, cloud based, etc.) for determining one or more privacy and/or security policies, wherein the user equipment and/or the other equipment may determine one or more parameters for sharing the data and the value with other users and/or entities.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) (e.g., sensors, games, social networking, web browser, media application, user interface (UI), GPS, map application, web client, etc.) to communicate with other UEs 101, one or more service providers 105a-105n (also collectively referred to as service providers 105), one or more product manufacturers 107a-107n (also collectively referred to as product manufacturers 107), one or more social networking platforms 109a-109n (also collectively referred to as social networking platforms 109), GPS satellite 111, and/or with other components of a communication network 113 directly and/or over the communication network 113. In one embodiment, the UEs 101 may include data collection modules 115a-115n (also collectively referred to as data collection module 115) for determining and/or collecting data associated with the UEs 101, one or more sensors of the UE 101, one or more users of the UEs 101, applications 103, one or more content items, one or more values associated with the data, and the like. In one embodiment, the UEs 101 may include privacy/security modules 117a-117n (also collectively referred to PS module 117) for determining one or more privacy and/or security policies for the data and/or the one or more values. In one embodiment, the service providers 105 may include and/or have access to one or more database 119a-119n (also collectively referred to as database 119), which may include various user information, user profiles, user preferences, product information, service provider information, manufacturer information, other service provider information, and the like.

In one embodiment, the system 100 determines at least one value for at least one instance of data. In one embodiment, the PS module 117 receives and/or collects the instance of data, for example, associated with a user. In one embodiment, the applications 103 and/or the data collection module 115 may receive and/or generate the at least one instance of data associated with a user, a product, and/or a service. For example, the data may be related to the user's health condition, location, product efficacy tests, test results, product usage, user performance (e.g., on a test, examination, etc.), user history, user preferences, financial information (e.g., bank account, credit score, mortgage payments, etc.), type of product, type of service, and the like. In one example, the user utilizes a device to perform a diagnostics of a user health parameter such as a heart rate before and/or after taking a certain product (e.g., medication, coffee, etc.) In another example, the data is associated with a user utilizing a device, an application, a service, etc. to take a college aptitude test. In one embodiment, the PS module, the applications 103, the data collection module 115, and/or the user determine at least one value for the at least one instance of data. For example, the value may be a range (e.g., 1, 2, 3, etc.) and/or may indicate a performance (e.g., good, bad, fail, pass, successful, etc.). In one example, the user may determine a pass/fail criteria for a certain test that user may take. In another example, a product and/or a service provider may determine the value associated with the instance of data. In one example, the applications 103, the data collection module 115, and/or the PS module 117 may determine and/or retrieve the value, the data, and/or other parameters from a service provider (e.g., a medical professional, a cloud based server, an examination database, a product database, etc.) 17. In one embodiment, the test result is associated with a diagnostic test, an efficacy test, and the like.

In one embodiment, the PS module 117 determines at least one privacy policy, at least one security policy, or a combination thereof based, at least in part, on the at least one value. In various embodiments, the PS module 117 utilizes one or more parameters associated with an instance of data and/or value for determining one or more privacy and/or security policies. For example, a specific data type (e.g., health related, personal financial numbers, college test, etc.) may indicate required/suggested privacy and/or security policies. In another example, values associated with the data (e.g., normal, abnormal, good, pass, fail, late, on time, 1, 2, 3, etc.) may indicate the required/suggested privacy and/or security policies. In one example, a UE 101 is utilized to check a user's blood pressure and take a measurement. In various embodiments, the applications 103, the data collection module 115, and/or the PS module 117 may determine a type of the data (e.g., data type of personal health information), a value of the data (e.g., blood pressure measurement), whether the value is within or outside of a normal range (e.g., according to a service provider, a chart, a database, etc.), location where the data and the value were generated, other contextual information associated with the data and/or the value, and the like. In one embodiment, the PS module 117 may utilize one or more algorithms to analyze the data, the value, and one or more user information for determining the privacy and security policy.

In one embodiment, cause, at least in part, an application of the at least one privacy policy, the at least one security policy, or a combination thereof with respect to the at least one instance of data. In various embodiments, the PS module 117, the applications 103, and/or one or more other entities of the system 100 may apply the privacy and/or the security policies to the data and the value; for example, for presenting, for sharing, for transmitting, for storing, and the like. In one embodiment, the privacy and/or the security policies may be applied to one or more portions of the data and/or the value.

In one embodiment, the system 100 determines contextual information associated with at least one owner, at least one recipient, at least one user, or a combination thereof of the at least one instance of data, wherein the at least one privacy policy, the at least one security policy, or a combination thereof is further based, at least in part, on the contextual information. In various embodiments, the PS module 117, the applications 103, the data collection module 115, the service providers 105, and the like may determine one or more information items related to an owner, a recipient, a user, and the like of the instance of data and/or value. For example, the one or more information items may include information on location, association, authority, qualification, security level, social networking, and the like. In one embodiment, the PS module 117 may utilize the contextual information in determining the privacy and/or security policies for the instance of data and/or value.

In one embodiment, the system 100 can initiate a sharing, an anonymizing, a filtering, or a combination thereof of the at least one value, the at least one instance of data, related user information, related product information, or a combination thereof based, at least in part, on the at least one privacy policy, the at least one security policy, or a combination thereof. In various embodiments, the PS module 117, the applications 103, the service providers 105, and the like may initiate a sharing of the value and/or the instance of data based, at least in part, on the privacy policy, the security policy, sharing rules or requirements, and the like with one or more other users, service providers, product manufacturers, social networking groups, and the like. In one embodiment, information associated with an owner, a user, a recipient, and like may be removed (e.g., make anonymous) from and before the value and/or the instance of data is shared, stored, transmitted, and the like. For example, in a case of a lower than expected efficacy, the user may wish to communicate the results to a community of like-minded consumers under a pseudonym. However, in a case where the results are at an expected level of efficacy (e.g., normal), the user may be encouraged to communicate about the efficacy using, for example, a user social networking (e.g., Facebook®, Twitter®, etc.) profile since the results are normal. In one embodiment, one or more information items associated with the instance of data and/or the value may be filtered; for example, by sorting, by categorizing, by listing, and the like, wherein the filtered instance of data and/or value may be utilized for sharing, for presenting, for storing, and the like.

In one embodiment, the system 100 may process the at least one value against one or more criteria to cause, at least in part, a categorization of the at least one value. In various one embodiments, the one or more criteria may include a range of values (e.g., 1, 2, 3, . . . , etc.) and the categorization may include information on whether the value may indicate/suggest a positive, negative, pass, fail, good, bad, and the like result. In various embodiments, determination and/or application of the privacy and/or the security policies may be based, at least in part, on the categorization information. For example, if an instance of data and/or its value indicate an unfavorable result (e.g., low value, bad, fail, etc.), then the privacy and/or the security policies may be different (e.g., more strict) than when the instance of data and/or its value indicate a more favorable result (e.g., pass, successful, etc.) In one example, sharing, transmission, storing, reporting, and the like of the instance of the data and/or the value may be based on the categorization. In one embodiment, the categorization utilized user and/or data type information to determine how personal the data may be (e.g., critical, embarrassing, private, sensitive, etc.)

In one embodiment, the system 100 generates a mapping of the at least one privacy policy, the at least one security policy, or a combination thereof to one or more potential values, one or more potential value ranges, or a combination thereof of the at least one instance of data. In one embodiment, the applications 103 and/or the PS module 117 generate a mapping (e.g., a corresponding listing) of the privacy and/or the security policy to the values (e.g., actual), to potential values (e.g., values that may be expected), and/or to a potential range of values (e.g., 1, 2, 3, pass, fail, partial pass, partial fail, etc.). For example, a mapping may indicate that results of a product efficacy test having a value range of 3-5 may be shared with manufacturer of the product and close social contacts (e.g., friends). In one embodiment, the mapping may indicate various levels of the privacy and/or security policies mapped to various data types, values, and the like.

In one embodiment, determine the at least one privacy policy, the at least one security policy or a combination thereof based, at least in part, on a comparison of the at least one value to the mapping. In one embodiment, a value (e.g., pass) associated with an instance of data (e.g., eye exam) may be compared with the mapping (e.g., a list) of the values for determining a privacy and/or security policy for the value and/or the instance of data. For example, the mapping may be utilized to determine a particular privacy and/or security policy for a particular data type, instance of data, value, user, location, context, and the like.

In one embodiment, the system 100 may cause a presentation of the at least one privacy policy, the at least one security policy, or a combination thereof. In one embodiment, the applications 103, the PS module 117, and/or the service providers 105 may present to a user a privacy and/or a security policy associated with an instance of data, a value, data type, and the like. For example, the UE 101 may utilize a UI application to present the privacy and/or security policy along with other information associated with an instance of data and/or value, wherein the presentation may be based on the mapping, user configuration, one or more service provider configurations, and the like.

In one embodiment, the system 100 determines an input for selecting, for confirming, or a combination thereof the at least one privacy policy, the at least on security policy, or a combination thereof. In one embodiment, a user may select from one or more privacy and/or security policies, which may be determined and/or presented by the PS module 117, the applications 103, the service providers 105, and/or other entities of the system 100. In one embodiment, the user may confirm a presented privacy and/or security policy, for example, for applying to an instance of data and/or value, or for storing at a device and/or at a service provider.

In one embodiment, the system 100 cause, at least in part, an initiation of the application of the at least one privacy policy, the at least one security policy, or a combination thereof based, at least in part, on the input. In one embodiment, the PS module 117 may apply the selected and/or confirmed privacy and/or security policy to the instance of data and/or value, wherein the application may be for sharing, storing, transmitting, analysis, and the like of the instance of data and/or the value. In one embodiment, the service providers 105 and/or another service provider (e.g., cloud based) may apply the privacy and/or security policy to the instance of data and/or the value.

In one embodiment, the system 100 determines to recommend the at least one privacy policy, the at least one security policy, or a combination thereof based, at least in part, on one or more products, one or more vendors of the one or more products, or a combination thereof associated with the at least one instance of data. In one embodiment, the PS module 117 may analyze and/or process information related to various products or services and vendors (e.g., manufacturers, suppliers, etc.) of the products or services for determining and recommending the privacy and/or security policies for an instance of data and/or value. In one embodiment, the applications 103 may access, request, process and/or analyze the information related to the products, services, and the vendors and provide the information to the PS module 117.

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE is any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.).

By way of example, the UEs 101, the service providers 105, product manufacturers 107, and the social networking platforms 109 communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, one or more entities of the system 100 may interact according to a client-server model with the applications 103 and/or the PS module 117 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
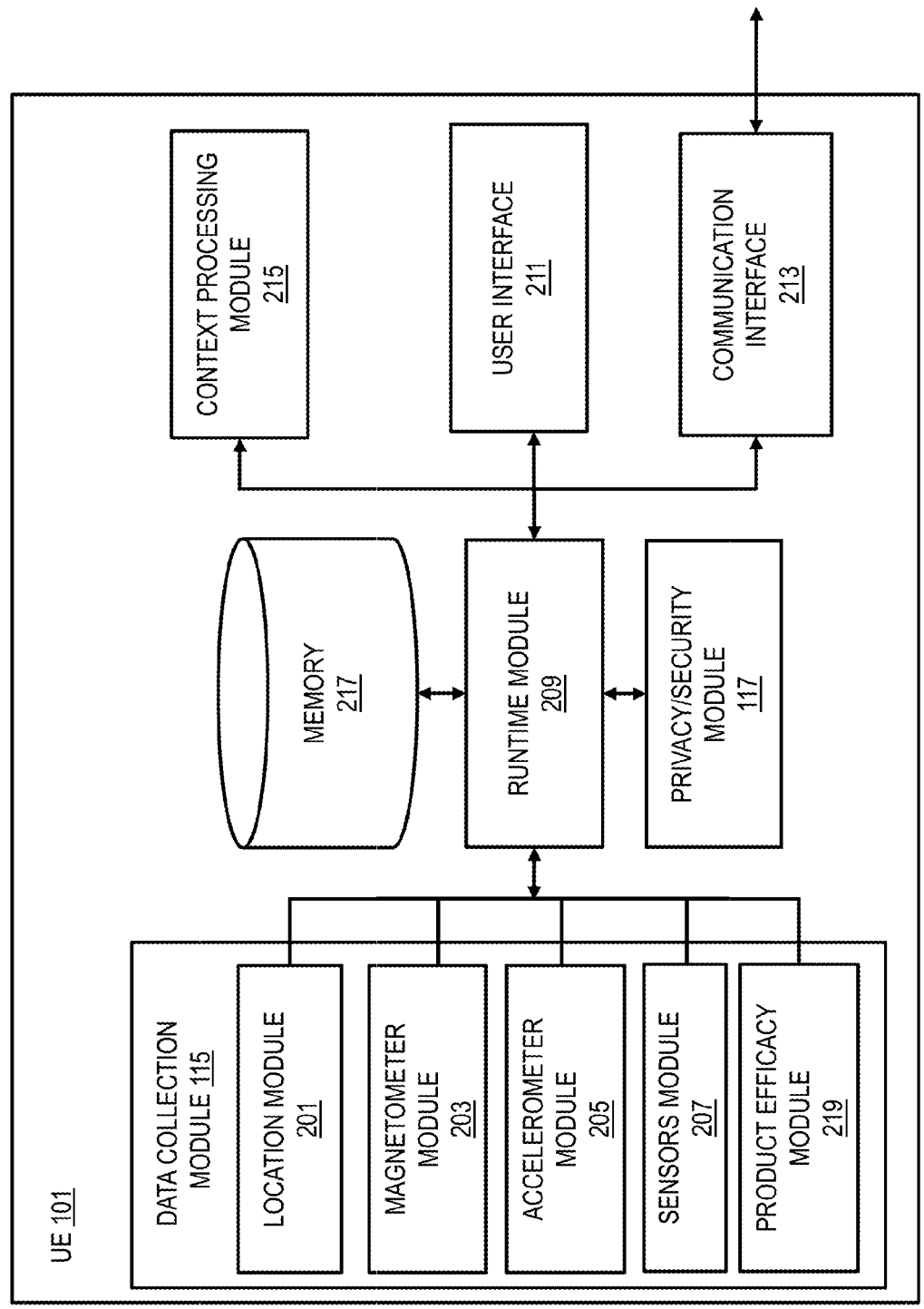
FIG. 2 is a diagram of the components of a user equipment capable of data collection and analysis for determining privacy and security policies, according to an embodiment.

FIG. 2 is a diagram of the components of a user equipment capable of data collection and analysis for determining privacy and security policies, according to an embodiment. By way of example, a UE 101 includes one or more components for receiving, collecting, generating, and/or analyzing data and values to determine privacy and security policies for the data and/or the values. It is contemplated that the functions of these components may be combined in one or more components or performed by other components of equivalent functionality. In this embodiment, the UE 101 includes a data collection module 115 that may include one or more location modules 201, magnetometer modules 203, accelerometer modules 205, sensors module 207, and product efficacy module 219. Further, the UE 101 may also include a runtime module 209 to coordinate the use of other components of the UE 101, a user interface 211, a communication interface 213, a context processing module 215, and memory 217. The applications 103 of the UE 101 can execute on the runtime module 209 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory 217 and are available to the PS module 117, the service providers 105, and/or to other entities of the system 100 via the communication interface 213. Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory 217, made available to other modules and/or applications 103 of the UE 101, and/or transmitted via the communication interface 213 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory 217, made available to other modules and/or applications 103 of the UE 101, and/or sent to one or more entities of the system 100.

In various embodiments, the sensors module 207 can determine environmental (e.g., atmospheric) conditions surrounding the UE 101, user mood (e.g., hungry, angry, tired, etc.), and the like. For example, the sensors module 207 may detect conditions including humidity, temperature, body temperature of the user, other biometric data of the user, etc. Once again, this information can be stored in the memory 217 and sent to the PS module 117 and/or other entities of the system 100. In certain embodiments, information collected from the data collection module 115 can be retrieved by the runtime module 209 and stored in memory 217, made available to other modules and/or applications 103 of the UE 101, and/or sent to one or more entities of the system 100.

In one embodiment, the communication interface 213 can be used to communicate with one or more entities of the system 100. Certain communications can be via methods such as an internet protocol, messaging (e.g., SMS, MMS, etc.), or any other communication method (e.g., via the communication network 113). In some examples, the UE 101 can send context information associated with the UE 101 to the service providers 105, product manufacturers 107, and/or the social networking platforms 109.

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 215 may be utilized in determining context information from the data collection module 115 and/or applications 103 executing on the runtime module 209. This information may be caused to be transmitted, via the communication interface 213, to the service providers 105 and/or to other entities of the system 100. The context processing module 215 may additionally be utilized as a means for determining information related to the user, an instance of data, a value, a product, the UE 101, and the like. In certain embodiments, the context processing module 215 can infer higher level context information from the context data such as favorite locations, significant places, common activities, interests in products and services, etc.

The product efficacy module 219 is capable of facilitating and/or performing product and/or service efficacy based on an analysis of data related to a characteristic associated with a user utilizing the product and/or service. In various embodiments, the product efficacy module 219 may interact with various sensors of the UE 101 and/or interface with other UEs 101 to collect, receive, retrieve, and/or share the data. The product efficacy module 219 can provide consumer diagnostics relating to, for example, fast moving consumer goods (FMCG) such as cosmetics, pharmaceuticals, various personal hygiene products, nutritional products, food products, etc., that can allow consumers to better understand the efficacy of their FMCG and nutritional products. By allowing consumers to substantiate the link between a product and its performance for themselves, a very powerful marketing tool is provided that can be used to improve brand loyalty, create greater product differentiation and encourage switching from brands who cannot offer such diagnostics. It also allows FMCG and nutritional product companies to produce products or product programs that are customized to the needs of individual consumers.

Figure 3:
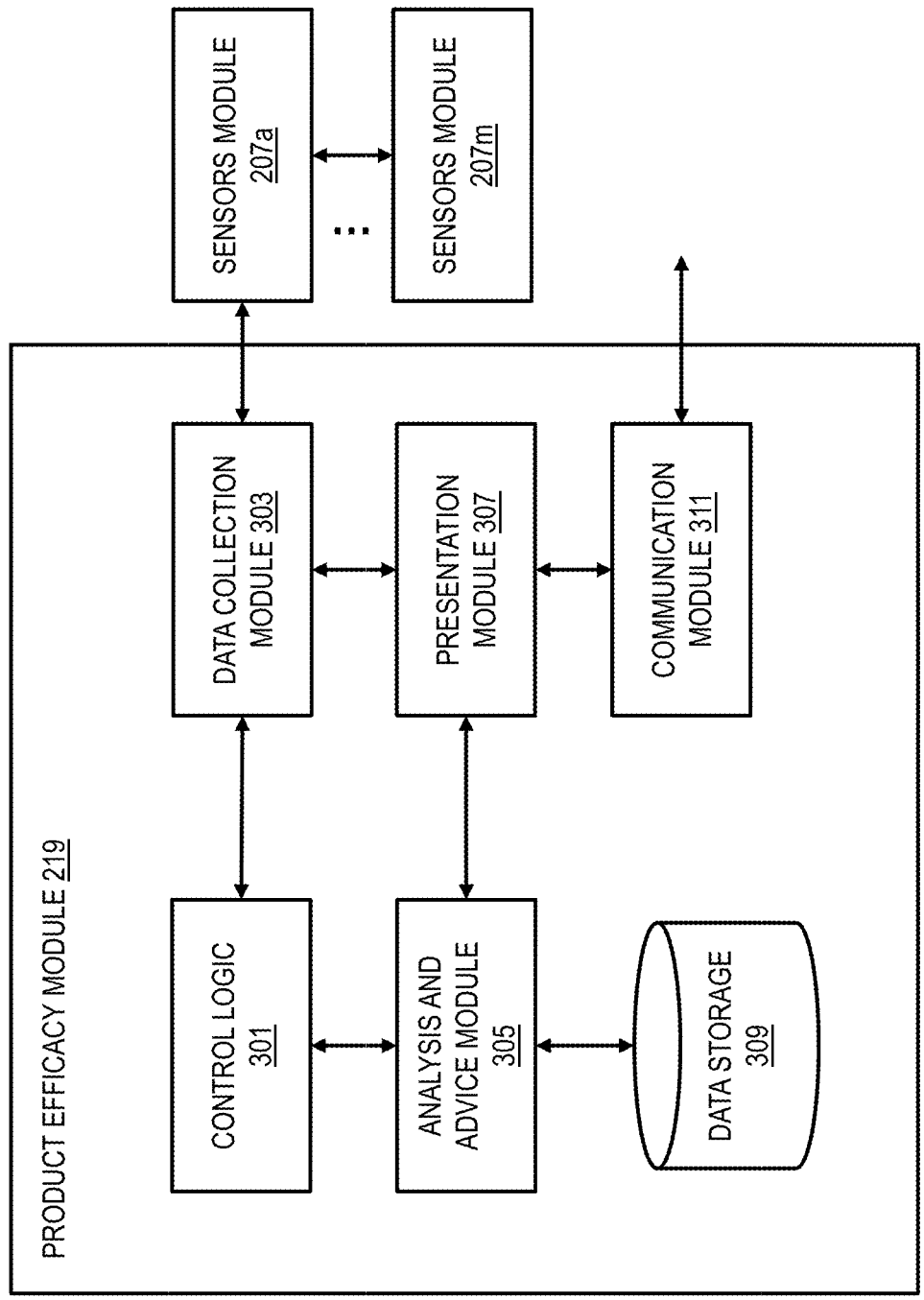
FIG. 3 is a diagram of components of a product efficacy module, according to an embodiment.

FIG. 3 is a diagram of components of a product efficacy module, according to an embodiment. By way of example, the product efficacy module 219 includes one or more components for providing a result of a determination regarding efficacy of a product based on an analysis of data related to a physical characteristic associated with a user utilizing a product and/or service. It is contemplated that the functions of these components may be combined in one or more components or performed by other components of equivalent functionality.

In one embodiment, the product efficacy module 219 includes a control logic 301, a data collection module 303, an analysis and advice module 305, a presentation module 307, a data storage 309, and a communication module 311. The control logic 301 can be used to control and coordinate the operation of the various modules of the product efficacy module 219. The data collection module 303 can be used to communicate with various sensor modules 207a-207m incorporated into the UE 101 in order to gather data related to characteristics (e.g., physical) associated with a user of the UE 101. The analysis and advice module 305 can be used to analyze the data collected in order to determine product efficacy based on appropriate algorithms, and to determine associated advice for the user based on the results of the product efficacy. Such analysis and advice can be performed in the UE 101, or can be performed by the service providers 105 or product manufacturers 107, for example, via a communication module 311. The presentation module 307, in conjunction with a display on the UE 101, can provide a user interface for interaction with the user. The data storage 309 can store data gathered, and analysis and advice results.

Thus, a method is provided of operating a mobile computing device for interacting with a user and detecting the efficacy of various products and/or services, such as skin, tooth and hair care products, pharmaceuticals, applied and/or utilized by the user and/or a service provider (e.g., a salon, a test center, health care provider, etc.). The method can include monitoring the efficacy of utilization of a product by interpreting two or more interactions between the device and the user, storing information relating to the efficacy of the product, and determining a level of performance of the product based either on trends of the stored information or by comparing the stored information to other reference points. Optionally, the method can rely upon a dedicated client on the mobile device which can prompt the user to take measurements, provide additional instructions, include the link to one or more social networking services or/and upload the output of the process to the service provider.

In one embodiment, system 100 substantially automatically determines and recommends a privacy and/or a security policy, wherein one or more data and value parameters are defined by the user. In various settings, different groups of products relate to different levels of personal sensitivity, for example, specific treatments for the cardiovascular system are likely to be less personally sensitive than treatments for the brain, nervous system, infectious diseases, and the like. Similarly, FMCG products may be classified—ranging from types of shaving products (which could be deemed not personal) through to types of anti-aging cream which may be deemed more personal. Different classes of products are not only used to determine how personal the associated diagnostic information is, but also to determine additional privacy settings. For example, pharmaceuticals vs. typical FMCG products, wherein this information may be helpful in determining how diagnostic data and values are classified, shared, utilized, and the like. Further, in certain situations sharing recipient parties may be determined from the classification information, for example, it may not be necessary to share with a doctor or a hospital the data and values associated with a typical FMCG product, but the user may wish to share it with other users via a social networking platform. Likewise, the user may want to share diagnostic data relating to cardiovascular drugs with a doctor and perhaps a hospital, but not with friends on the social networking platform. In various embodiments, the data and values may be shared anonymously based on the data and value. For example, in the case of a lower than expected efficacy, the user can communicate with a community of likeminded consumers under a pseudonym. However, in case of expected level of efficacy, then there should be fewer issues with privacy and hence the user may be encouraged to communicate about the data and value using, for example, user's social networking platform. In various embodiments, location of a user, an instance of data, and value may be utilized in determining a privacy and security policy. For example, if the user is in a hospital location, then data and value of diagnostic information should be shared with hospital staff in that same location. In various embodiments, the one or more suggested privacy and security settings are presented to a user for selection and/or confirmation, wherein the selected settings may be utilized under similar conditions of data, value, and/or location.

In various embodiments, the UE 101 may be used to identify a product that is being evaluated. For example, the UE 101 may scan a barcode on the product, or receive product information via radio-frequency identification (RFID) in order for the module to obtain information regarding the product for use during the analysis and advice. Thus, when the user initiates the application of the product for the first time, the product can be identified and various information regarding the product can be obtained locally or remotely, for example, via a remote server. A database can then be established (e.g., in the data storage 309 of the product efficacy module 219) for the product and the data initially scanned/received. Various guidance and instructions regarding the product can be provided to the user, and various alerts can be set in order to aid the user in gathering data.

In other words, the method involves the use of a mobile terminal which allows the measurement and evaluation of the efficacy of FMCG, the user's effectiveness of using certain FMCG products, nutritional products, etc. It includes at least one sensor, a processor, and a means to communicate. The mobile terminal takes at least two measurements, using an integrated sensor, of physical characteristic, such as skin or hair characteristics, and then calculates an estimate of the efficacy of the FMCG or nutritional product being used. The efficacy of the product can be measured in terms of skin tone, tooth color, hair care "quality," breath odor, skin chemistry, etc. depending upon the product whose efficacy is being measured. Further, depending on available sensors and devices, various parameters such as hair pH, hair secretions, makeup residue, shampoo residue both chemical and nanoparticulates, blood pressure, heart ECG, brain EEG, saliva constituents, breath odor, etc. may also be characterized for determining related product efficacy.

Upon calculation of the product efficacy, the result can be integrated with other system features for user profiling or suggested purchases, etc. The method can be expanded and made more specific by integrating the hardware needed, with a method that is related to the context of its use. This can, for example, be to take the product described above, and then to integrate this with existing or new contextual experience methods which will be enabled by the hardware.

Alternatively, the product efficacy module 219 can be contained within a product which is connected to a mobile device through an interface such as a wired or wireless communication means (e.g., Bluetooth™, WiFi). In this instance, the UE can be fixed at, for example, the point of sale of FMCGs (e.g., supermarket, pharmacy, etc.) or related services (e.g., hairdresser, spa, etc.).

The method can be applied to measure the performance of a number of FMCG products including, for example: tooth whitening toothpaste, by measuring over time changes in tooth color; skin whitening cream, by measuring over time changes in skin color; anti-aging cream, by measuring over the time changes in skin texture/wrinkles; shaving products, by measuring hair length over time; hair cleaning products such as shampoo, by measuring shampoo or hair secretion residue; hair coloring, by measuring over time changes in color; make-up such as foundation, mascara, and other applied layers that alter the outer appearance of the face and skin; breath freshening products, by measuring characteristics of the breath prior to and after using the product; etc.

A UE 101 may be based on a mobile terminal with specific hardware features that is used according to a prescribed method and which is personal to a user, and/or a stand-alone unit. Such a stand-alone unit could contain optical sensors and additional sensing mechanisms, and a means of communicating sensor data to a mobile device through wired or wireless communication. Stand-alone units can be located at the point of sale of FMCGs (e.g., supermarket, pharmacy, etc.) or associated points of sale (e.g., hairdresser, spa, etc.), or even at the home of the user.

The UE 101 may be provided as a mobile terminal or mobile device having one or more sensors, such as a CMOS or CCD as part of a camera system. As the technology becomes more prevalent and available, different types of sensors capable of sensing and characterizing skin and hair pH, hair secretions, makeup residues, shampoo residue both chemical and nanoparticulates, saliva constituents, breath odor, etc. can also be added. The UE can also feature at least one illumination source, such as an LED or camera flash, or a display such as an LCD backlight or a self-emitting display such as an OLED. The UE can also include the ability to provide an illumination source which operates at one or more specific wavelengths, for example, a color backlit LCD or self-emitting OLED. The sensor and source of illumination can be combined in a number of different ways and combined with other sensors added to sense different physical or biological characteristics.

For the performance and efficacy estimation of tooth whitening products, for example, a white LED (such as one used to provide the camera flash function) can be controlled in a defined way so as to illuminate one or more of the users teeth, which can then be imaged using an imaging device with suitable color sensitivity. Optionally, a calibration method can be included to ensure repeatable and robust results. Other illumination methods incorporating different light wavelengths generated by other displays can also be considered if necessary.

For the performance and efficacy estimation of foundation and lipstick, the camera and the flash can be used or, where present a secondary camera (e.g., a camera used for video conferencing facing outward from the display), to get an image of the face from before and after the application of make-up. The image can be used to measure the changes in image features such as contrast and reflectance that correlate with the application of makeup. Image analysis can be performed on the full face or on particular areas such as the lips.

For the performance and efficacy estimation of skin whitening cream, a main or secondary display of the mobile terminal may be controlled in such a way so as to provide the necessary illumination so as to be able to assess the color tone of skin. The resulting reflected light is detected by a sensor, which has sufficient color sensitivity so as to be able to function in this application. Optionally, a calibration method can be included to ensure repeatable and robust results.

For the performance and efficacy estimation of anti-aging cream, a main or secondary display of the mobile terminal can be controlled in such a way so as to provide the necessary illumination so as to be able to assess the texture and structure of skin. The resulting reflected light is detected by a sensor, which has sufficient sensitivity so as to be able to function in this application. Optionally, a calibration method can be included to ensure repeatable and robust results. Optionally, a biosensor can be used to collect further information (e.g., by taking a small sample) on skin dryness, for example.

For the performance and efficacy estimation of shaving products, a main or secondary display of the mobile terminal can be controlled in such a way so as to provide the necessary illumination so as to be able to use an optical sensor to detect likely characteristics of hair growth. A biosensor can be used to detect and interpret skin secretions to further try and determine the efficacy of shaving products. Optionally, a calibration method can be included to ensure repeatable and robust results.

For the performance and efficacy estimation of hair care products, a biosensor can be used to detect hair and scalp secretions in such a way as to be able to measure characteristics that are important to determine the efficacy of hair care products. In this application, a sensor or sensors would measure both the status of the hair and scalp as well the residue of the hair care product for example many conditioners acidify the hair which can be detected with a pH sensor while the shampoo introduces novel surfactants on the hair surface which can be measured chemically, by changes in hair conductance or by changes in the optical properties of the hair such as reflectance. Certain shampoos and sunscreens leave residues of nanoparticles which may be measurable while, over time, the amount of the hair's naturally lubricant, sebum accumulates that can be measured using chemical sensors specific for waxes and specific fatty acids. Optionally, a calibration method can be included to ensure repeatable and robust results.

In usual operation of a mobile terminal, a user will hold the mobile terminal next to their ear, which can bring parts of the mobile terminal into contact with their hair and skin. This makes it possible to use some of the embodiments in an automatic mode, whereby the user does not have to undertake any special or exceptional action to benefit from the functionality proposed. For example, in the skin whitening cream efficacy embodiment the illumination can be provided by the main display (OLED of backlit LCD), and imaging function by an appropriately positioned secondary camera, thereby collecting data during use of the phone. In a further example, for the hair product embodiment, a biosensor can be incorporated in part of the mobile terminal most likely to come into contact with the users hair, scalp or, ears to detect secretions which may allow the efficacy of hair care products to be assessed.

In various embodiments, one or more sensors may be utilized to measure and/or access user behavioral, psychological, physiological, and the like performance parameters. For example, one or more sensors (e.g., pulse detection, heart beat measurement, skin temperature sensing, stress-induced perspiration/moisture detection, etc.) may be utilized to determine user stress level before and after utilizing a product, a relaxation technique, and the like. In one example, performance of a user utilizing various products (e.g., running shoes, hiking shoes, snow skis, roller blades, energy bars, energy drinks, etc.) may be determined by analyzing accelerometer, GPS, and the like measurements when the user is performing certain tasks such as running, hiking, climbing, descending, jumping, skiing, roller blading, and the like. In various embodiments, results of the various measurements may be compared based on current and/or previous products utilized by the user for the given physical and/or psychological tasks in order to determine any potential changes (e.g., performance improvements contributable to the products).

The product efficacy module can operate in several modes, for example, a systematic mode or a spontaneous mode, or an automatic mode or a manual mode. For example, in a systematic mode, the mobile device can remind a user when to apply FMCG product(s) and measure efficacy. In a spontaneous mode, a user can decide when to measure efficacy and apply FMCG products. Under both modes, measurement can be made automatically in conjunction with normal phone use, or through a dedicated manual step, as prompted by the dedicated client. Measurements are taken and stored over time with the option of on-device or remote storage with appropriate privacy and security measures in place. Resulting time series data can be locally and/or remotely stored, analyzed, and/or displayed. The data collected can be benchmarked against other products, which can include comparisons with competing FMCG products. The resulting data can be interpreted and used to make recommendations and suggestions to the user (e.g., frequency of user, quantity of use, etc.). The mobile device can offer options of providing adverts (e.g., coupons for the product, for a competing product, for related products) or access to additional services (e.g., matching color of make-up with color of clothing, etc.). The systematic mode would generally provide a higher probability of accurate results, than the spontaneous mode.

Figure 10:
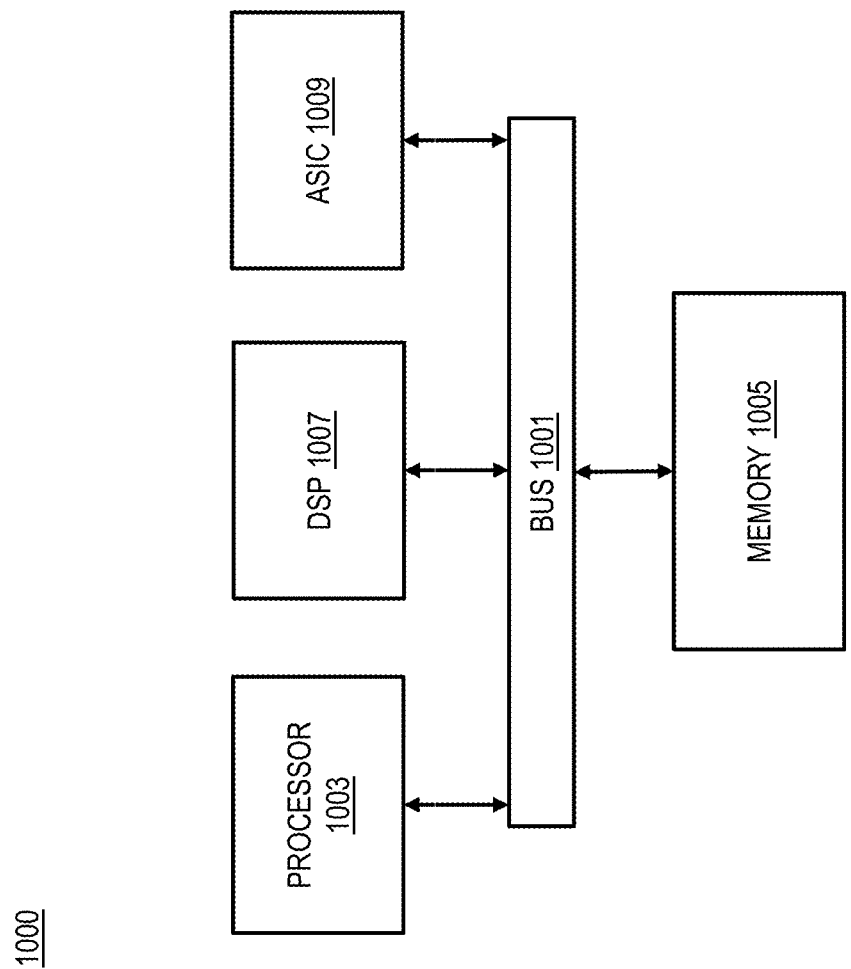
FIG. 10 is a diagram of a chip set that can be used to implement an embodiment of the invention.

FIG. 4 is a flowchart of a process for determining an instance of data, value, privacy, and security policies for application to the instance of data and/or value, according to an embodiment. In one embodiment, the PS module 117 and/or the applications 103 perform the process 400 and are implemented in, for instance, a chip set including a processor and a memory as shown in FIG. 10. As such, the PS module 117 and/or the applications 103 can provide means for accomplishing various parts of the process 400 as well as means for accomplishing other processes in conjunction with other components of the system 100. Throughout this process, the PS module 117 is referred to as completing various portions of the process 400, however, it is understood that the UE 101 can perform some of and/or all of the process steps. Further, in various embodiments, the PS module 117 may be referred to as implemented on a UE 101, however, it is understood that all or portions of the PS module 117 may be implemented in one or more entities of the system 100.

In step 401, the PS module 117 and/or the applications 103 determine at least one value for at least one instance of data. In one embodiment, the PS module 117 receives and/or collects the instance of data, for example, associated with a user. In one embodiment, the applications 103 and/or the data collection module 115 may receive and/or generate the at least one instance of data associated with a user, a product, and/or a service. For example, the data may be related to the user's health condition, location, product efficacy tests, test results, product usage, user performance (e.g., on a test, examination, etc.), user history, user preferences, financial information (e.g., bank account, credit score, mortgage payments, etc.), type of product, type of service, and the like. In one example, the user utilizes a device to perform a diagnostics of a user health parameter such as a heart rate before and/or after taking a certain product (e.g., medication, coffee, etc.) In another example, the data is associated with a user utilizing a device, an application, a service, etc. to take a college aptitude test. In one embodiment, the PS module, the applications 103, the data collection module 115, and/or the user determine at least one value for the at least one instance of data. For example, the value may be a range (e.g., 1, 2, 3, etc.) and/or may indicate a performance (e.g., good, bad, fail, pass, successful, etc.). In one example, the user may determine a pass/fail criteria for a certain test that user may take. In another example, a product and/or a service provider may determine the value associated with the instance of data. In one example, the applications 103, the data collection module 115, and/or the PS module 117 may determine and/or retrieve the value, the data, and/or other parameters from a service provider (e.g., a medical professional, a cloud based server, an examination database, a product database, etc.) 17. In one embodiment, the test result is associated with a diagnostic test, an efficacy test, and the like.

In step 403, the PS module 117 determines at least one privacy policy, at least one security policy, or a combination thereof based, at least in part, on the at least one value. In various embodiments, the PS module 117 utilizes one or more parameters associated with an instance of data and/or value for determining one or more privacy and/or security policies. For example, a specific data type (e.g., health related, personal financial numbers, college test, etc.) may indicate required/suggested privacy and/or security policies. In another example, values associated with the data (e.g., normal, abnormal, good, pass, fail, late, on time, 1, 2, 3, etc.) may indicate the required/suggested privacy and/or security policies. In one example, a UE 101 is utilized to check a user's blood pressure and take a measurement. In various embodiments, the applications 103, the data collection module 115, and/or the PS module 117 may determine a type of the data (e.g., data type of personal health information), a value of the data (e.g., blood pressure measurement), whether the value is within or outside of a normal range (e.g., according to a service provider, a chart, a database, etc.), location where the data and the value were generated, other contextual information associated with the data and/or the value, and the like. In one embodiment, the PS module 117 may utilize one or more algorithms to analyze the data, the value, and one or more user information for determining the privacy and security policy.

In step 405, the PS module 117 and/or the applications 103 cause, at least in part, an application of the at least one privacy policy, the at least one security policy, or a combination thereof with respect to the at least one instance of data. In various embodiments, the PS module 117, the applications 103, and/or one or more other entities of the system 100 may apply the privacy and/or the security policies to the data and the value; for example, for presenting, for sharing, for transmitting, for storing, and the like. In one embodiment, the privacy and/or the security policies may be applied to one or more portions of the data and/or the value.

In step 407, the PS module 117 and/or the applications 103 determine contextual information associated with at least one owner, at least one recipient, at least one user, or a combination thereof of the at least one instance of data, wherein the at least one privacy policy, the at least one security policy, or a combination thereof is further based, at least in part, on the contextual information. In various embodiments, the PS module 117, the applications 103, the data collection module 115, the service providers 105, and the like may determine one or more information items related to an owner, a recipient, a user, and the like of the instance of data and/or value. For example, the one or more information items may include information on location, association, authority, qualification, security level, social networking, and the like. In one embodiment, the PS module 117 may utilize the contextual information in determining the privacy and/or security policies for the instance of data and/or value.

FIG. 5 is a flowchart of a process for categorizing, filtering, anonymizing, and sharing of an instance of a data and/or value, according to an embodiment. In one embodiment, the PS module 117 and/or the applications 103 perform the process 500 and are implemented in, for instance, a chip set including a processor and a memory as shown in FIG. 10. As such, the PS module 117 and/or the applications 103 can provide means for accomplishing various parts of the process 500 as well as means for accomplishing other processes in conjunction with other components of the system 100. Throughout this process, the PS module 117 is referred to as completing various portions of the process 500, however, it is understood that the UE 101 can perform some of and/or all of the process steps. Further, in various embodiments, the PS module 117 may be referred to as implemented on a UE 101, however, it is understood that all or portions of the PS module 117 may be implemented in one or more entities of the system 100.

In step 501, the PS module 117 and/or the applications 103 cause, at least in part, an initiation of a sharing, an anonymizing, a filtering, or a combination thereof of the at least one value, the at least one instance of data, related user information, related product information, or a combination thereof based, at least in part, on the at least one privacy policy, the at least one security policy, or a combination thereof. In various embodiments, the PS module 117, the applications 103, the service providers 105, and the like may initiate a sharing of the value and/or the instance of data based, at least in part, on the privacy policy, the security policy, sharing rules or requirements, and the like with one or more other users, service providers, product manufacturers, social networking groups, and the like. In one embodiment, information associated with an owner, a user, a recipient, and like may be removed (e.g., make anonymous) from and before the value and/or the instance of data is shared, stored, transmitted, and the like. For example, in a case of a lower than expected efficacy, the user may wish to communicate the results to a community of like-minded consumers under a pseudonym. However, in a case where the results are at an expected level of efficacy (e.g., normal), the user may be encouraged to communicate about the efficacy using, for example, a user social networking (e.g., Facebook®, Twitter®, etc.) profile since the results are normal. In one embodiment, one or more information items associated with the instance of data and/or the value may be filtered; for example, by sorting, by categorizing, by listing, and the like, wherein the filtered instance of data and/or value may be utilized for sharing, for presenting, for storing, and the like.

In step 503, the PS module 117 and/or the applications 103 process and/or facilitate a processing of the at least one value against one or more criteria to cause, at least in part, a categorization of the at least one value, wherein (a) the at least one privacy policy, the at least one security policy, or a combination thereof; (b) the application of the at least one privacy policy, the at least one security policy, or a combination thereof; or (c) a combination is further based, at least in part, on the categorization. In various one embodiments, the one or more criteria may include a range of values (e.g., 1, 2, 3, . . . , etc.) and the categorization may include information on whether the value may indicate/suggest a positive, negative, pass, fail, good, bad, and the like result. In various embodiments, determination and/or application of the privacy and/or the security policies may be based, at least in part, on the categorization information. For example, if an instance of data and/or its value indicate an unfavorable result (e.g., low value, bad, fail, etc.), then the privacy and/or the security policies may be different (e.g., more strict) than when the instance of data and/or its value indicate a more favorable result (e.g., pass, successful, etc.) In one example, sharing, transmission, storing, reporting, and the like of the instance of the data and/or the value may be based on the categorization. In one embodiment, the categorization utilized user and/or data type information to determine how personal the data may be (e.g., critical, embarrassing, private, sensitive, etc.)

In step 505, the PS module 117 and/or the applications 103 cause, at least in part, a generation of a mapping of the at least one privacy policy, the at least one security policy, or a combination thereof to one or more potential values, one or more potential value ranges, or a combination thereof of the at least one instance of data. In one embodiment, the applications 103 and/or the PS module 117 generate a mapping (e.g., a corresponding listing) of the privacy and/or the security policy to the values (e.g., actual), to potential values (e.g., values that may be expected), and/or to a potential range of values (e.g., 1, 2, 3, pass, fail, partial pass, partial fail, etc.). For example, a mapping may indicate that results of a product efficacy test having a value range of 3-5 may be shared with manufacturer of the product and close social contacts (e.g., friends). In one embodiment, the mapping may indicate various levels of the privacy and/or security policies mapped to various data types, values, and the like.

In step 507, the PS module 117 and/or the applications 103 determine the at least one privacy policy, the at least one security policy or a combination thereof based, at least in part, on a comparison of the at least one value to the mapping. In one embodiment, a value (e.g., pass) associated with an instance of data (e.g., eye exam) may be compared with the mapping (e.g., a list) of the values for determining a privacy and/or security policy for the value and/or the instance of data. For example, the mapping may be utilized to determine a particular privacy and/or security policy for a particular data type, instance of data, value, user, location, context, and the like.

FIG. 6 is a flowchart of a process for presentation and recommendation of a privacy and/or a security policy and determining a selection and/or a confirmation, according to an embodiment. In one embodiment, the PS module 117 and/or the applications 103 perform the process 600 and are implemented in, for instance, a chip set including a processor and a memory as shown in FIG. 10. As such, the PS module 117 and/or the applications 103 can provide means for accomplishing various parts of the process 600 as well as means for accomplishing other processes in conjunction with other components of the system 100. Throughout this process, the PS module 117 is referred to as completing various portions of the process 600, however, it is understood that the UE 101 can perform some of and/or all of the process steps. Further, in various embodiments, the PS module 117 may be referred to as implemented on a UE 101, however, it is understood that all or portions of the PS module 117 may be implemented in one or more entities of the system 100.

In step 601, the PS module 117 and/or the applications 103 cause, at least in part, a presentation of the at least one privacy policy, the at least one security policy, or a combination thereof. In one embodiment, the applications 103, the PS module 117, and/or the service providers 105 may present to a user a privacy and/or a security policy associated with an instance of data, a value, data type, and the like. For example, the UE 101 may utilize a UI application to present the privacy and/or security policy along with other information associated with an instance of data and/or value, wherein the presentation may be based on the mapping, user configuration, one or more service provider configurations, and the like.

In step 603, the PS module 117 and/or the applications 103 determine an input for selecting, for confirming, or a combination thereof the at least one privacy policy, the at least on security policy, or a combination thereof. In one embodiment, a user may select from one or more privacy and/or security policies, which may be determined and/or presented by the PS module 117, the applications 103, the service providers 105, and/or other entities of the system 100. In one embodiment, the user may confirm a presented privacy and/or security policy, for example, for applying to an instance of data and/or value, or for storing at a device and/or at a service provider.

In step 605, the PS module 117 and/or the applications 103 cause, at least in part, an initiation of the application of the at least one privacy policy, the at least one security policy, or a combination thereof based, at least in part, on the input. In one embodiment, the PS module 117 may apply the selected and/or confirmed privacy and/or security policy to the instance of data and/or value, wherein the application may be for sharing, storing, transmitting, analysis, and the like of the instance of data and/or the value. In one embodiment, the service providers 105 and/or another service provider (e.g., cloud based) may apply the privacy and/or security policy to the instance of data and/or the value.

In step 607, the PS module 117 and/or the applications 103 determine to recommend the at least one privacy policy, the at least one security policy, or a combination thereof based, at least in part, on one or more products, one or more vendors of the one or more products, or a combination thereof associated with the at least one instance of data. In one embodiment, the PS module 117 may analyze and/or process information related to various products or services and vendors (e.g., manufacturers, suppliers, etc.) of the products or services for determining and recommending the privacy and/or security policies for an instance of data and/or value. In one embodiment, the applications 103 may access, request, process and/or analyze the information related to the products, services, and the vendors and provide the information to the PS module 117.

FIGS. 7A-7B illustrate example mappings of privacy and security policies to an instance of data and/or values, according to various embodiments.

FIG. 7A depicts an example mapping 700 of privacy and security policies to instances of data and values associated with products and processes, for example, pharmaceuticals and/or medical processes. In one use case scenario, a user and/or a service provider wish to monitor efficacy of certain drugs, which influence human heart, wherein the effects may be detected via an ECG or equivalent process utilizing various sensors (e.g., acoustic or other sensors) on one more UEs 101. In this example 700, the mapping includes a privacy/security setting 701, user input conditions location parameter 703 (e.g., of a user) associated with the instance of data and value, and efficacy 705 (e.g., results, value, etc.) associated with an instance of data, and output privacy policy 707. In one embodiment, the various parameters and conditions 701, 703, 705, and 707 may be defined by a user, a service provider (e.g., a healthcare professional), by a product manufacturer, and/or one or more other entities associated with the user, with a product included in the process, and the like. In one embodiment, the output privacy policy may substantially automatically be determined by the PS module 117 based, at least in part, on the location parameter 703 and the efficacy 705. In example 709, the privacy/security policy 701 is determined as policy-1 "normal", which includes location parameter 703 set to "at home", efficacy 705 set at "as expected", wherein if the conditions of the 703 and 705 are met, the output privacy policy is determined such that the instance of data and value may be shared with the product manufacturer and update the user's status at a social networking platform (e.g., Facebook®). In example 711, the privacy/security policy 701 is determined as policy-2 "normal", which includes location parameter 703 set to "at hospital", efficacy 705 set at "as expected", wherein if the conditions of the 703 and 705 are met, the output privacy policy is determined such that the instance of data and value may be shared with the product manufacturer and with medical staff of the hospital, and update the user's status at a social networking platform (e.g., Facebook®). In example, 713, the privacy/security policy 701 is determined as policy-3 "low", which includes location parameter 703 set to "at home", efficacy 705 set at "less than expected", wherein if the conditions of the 703 and 705 are met, the output privacy policy is determined such that the instance of data and value may be shared with the product manufacturer and with pre-authorized medical staff at a local clinic, hospital, urgent care center, and the like. In one embodiment, a user may grant the pre-authorization under specific conditions to a healthcare staff (e.g., to a doctor's mobile device via near field communication (NFC), Bluetooth®, etc.) treating the user them. In one embodiment, a user device may determine previous authorizations granted to one or more other devices for subsequent sharing of data and values.

FIG. 7B depicts an example mapping 750 of privacy and security policies to instances of data and values associated with products and processes, for example, FMCG and/or related processes. In one use case scenario, a user and/or a service provider wish to monitor efficacy (e.g., performance) of FMCG products, for example, tooth whitening products, anti-aging cream, hair care products, auto polisher, and the like, wherein the effects may be detected via various sensors, displays, lighting (e.g., flash, LED, etc.), and the like on one or more UEs 101. In this example 750, the mapping includes a privacy/security setting 701, user input conditions location parameter 703 (e.g., of a user) associated with the instance of data and value, and efficacy 705 (e.g., results, value, etc.) associated with an instance of data, output privacy policy 707, and anonymity control 751. In one embodiment, the various parameters and conditions 701, 703, 705, 707, and 751 may be defined by a user, a service provider (e.g., a healthcare professional), by a product manufacturer, and/or one or more other entities associated with the user, with a product included in the process, and the like. In one embodiment, the output privacy policy may substantially automatically be determined by the PS module 117 based, at least in part, on the location parameter 703, the efficacy 705, and the anonymity control 751. In example 753, the privacy/security policy 701 is determined as policy-1 "positive", which includes location parameter 703 set to "at home", efficacy 705 set at "as expected", anonymity control 751 set as "no anonymity control," wherein if the conditions of the 703, 705, and 751 are met, the output privacy policy is determined such that the instance of data and value may be shared with the product manufacturer and update the user's status at a social networking platform (e.g., Facebook®, Twitter®, etc.) for friends. In example 755, the privacy/security policy 701 is determined as policy-2 "negative", which includes location parameter 703 set to "at home", efficacy 705 set at "less than expected," and the anonymity control set as "no anonymity control," wherein if the conditions of the 703, 705, and 751 are met, the output privacy policy is determined such that the instance of data and value may be shared with the product manufacturer only. In example 757, the privacy/security policy 701 is determined as policy-3 "positive", which includes location parameter 703 set to "at a social network check-in point" (e.g., Four Square®), efficacy 705 set at "as expected", anonymity control 751 set as "no anonymity control," wherein if the conditions of the 703, 705, and 751 are met, the output privacy policy is determined such that the instance of data and value may be shared with the product manufacturer, update the user's status at a social networking platform (e.g., Facebook®, Twitter®, etc.) for friends, and update other users with an interest in the product who are at the social network check-in point. In example 759, the privacy/security policy 701 is determined as policy-4 "positive", which includes location parameter 703 set to "at home," efficacy 705 set at "as expected", anonymity control 751 set as "no anonymity control," wherein if the conditions of the 703, 705, and 751 are met, the output privacy policy is determined such that the instance of data and value may be shared with the product manufacturer and update social networking community, including user's identity, for users with a shared interest. In example 761, the privacy/security policy 701 is determined as policy-5 "negative", which includes location parameter 703 set to "at home," efficacy 705 set at "less than expected", anonymity control 751 set as "anonymity control," wherein if the conditions of the 703, 705, and 751 are met, the output privacy policy is determined such that the instance of data and value may be shared with the product manufacturer and update social networking community, under an anonymous identity (e.g., a pseudonym), for users with a shared interest.

Figure 8F:
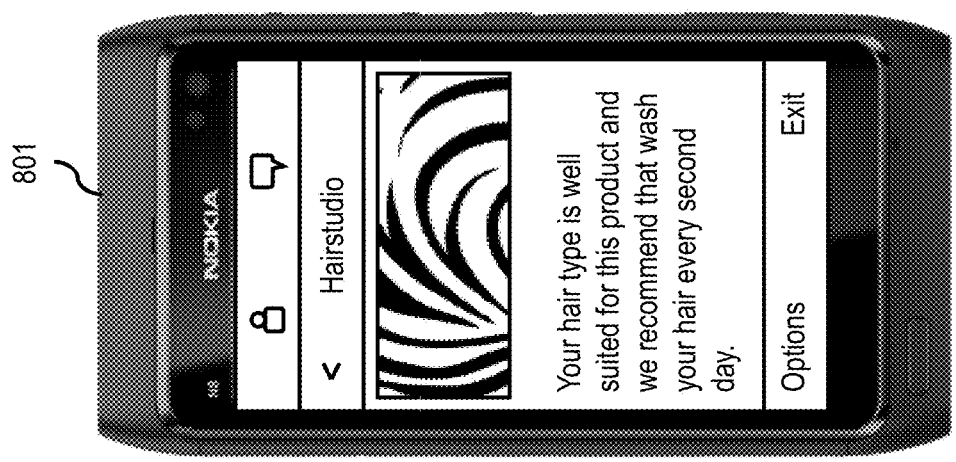
Figure 8E:
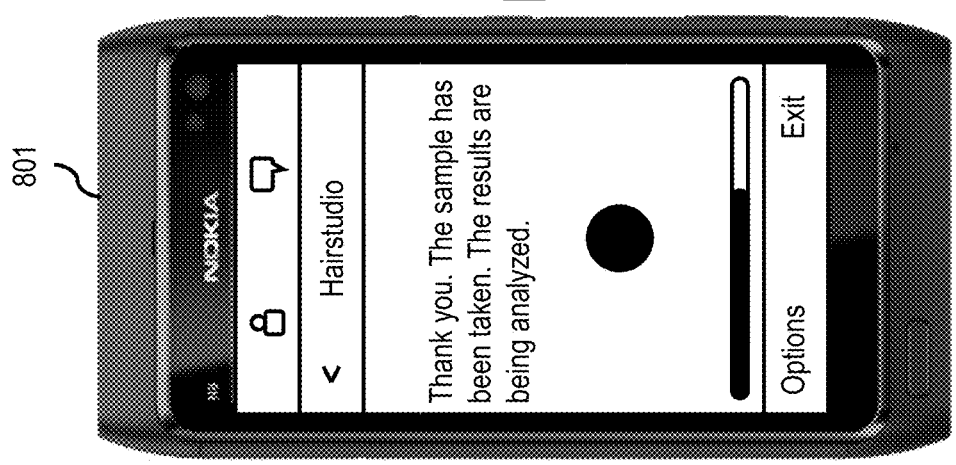
Figure 8D:
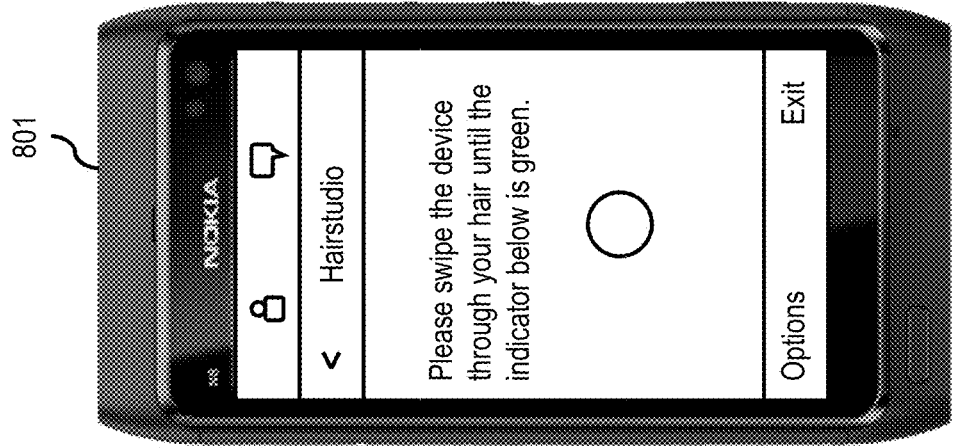

FIGS. 8A-8F depict a mobile device having a user interface that can be used to help gather data in a process for providing a result of a determination regarding efficacy of a product, according to another embodiment. FIG. 8A depicts a user equipment 801 having a display with a user interface 803. The user interface 803 includes a link 805 to a product efficacy module application, while in this example is titled "Hairstudio." Upon selecting the link 805, the user interface could display various links, as shown in FIG. 8B, to applications within the product efficacy module 219, for example, product information, how to use the product, recommendations for similar or related products, and a link to actuate an analysis of a user's hair. Thus, by selecting the "Analyze hair" link 807, then the user interface would display various screens that will guide the user through the hair analysis steps, as shown in FIGS. 8C through 8E.

As shown in FIG. 8C, the user interface explains to the user that, in order to provide the user with the best results of the products, the device will need to analyze the user's hair type. By selecting the "Make test" link 809, the product efficacy module 219 will then begin a preliminary analysis of the user's hair. As shown in FIG. 8D, the user interface instructs the user to swipe the UE 801 through their hair until an indicator turns to green (shown in FIG. 8E as a filled circle), from an original red color (shown in FIG. 8D as a hollow circle). Alternatively, or in addition to the visual indicator shown in FIGS. 8D and 8E, the UE can provide an alert to the user that the sampling has been completed. For example, the UE can alert the user by making an audible sound or by vibrating, etc. Thus, the UE 801 will activate an appropriate sensor and monitor for detection of the physical characteristic until sufficient data is collected to provide a first data measurement of the physical characteristic, at which time the user interface will show a green indicator and/or activate another alert for the user. The UE 801 can also provide a toggle switch on the user interface to allow the user to select whether the audible alert is activated or not, for example, by tapping or pressing on the red button on the display screen at the outset of the sensing process. Then, in FIG. 8F, the product efficacy module 219 will provide a product user recommendation to the user, and store the data collected for later use to determine efficacy of the product after the product has been used. Thus, the product efficacy module 219 can either automatically collect further data at a later time, or alert the user to manually collect such data at a later time, and use the two or more data points collected to provide the user with a product efficacy determination. If manual collection is used, then the user interface can guide the user through the data collection process using interfaces such as shown in FIGS. 8C through 8E, and then provide the user with a product efficacy result in a next user interface screen.

Once the efficacy has been determined, in the case of worse than expected effect, a recommendation could be made regarding how to apply the product in a different way, for example, more frequently. A different product from the same family of products could also be recommended, based on the impact of the original product. The recommendation could be done on a priori basis. Alternatively, the recommendation could be made with the help of a recommender system. Such a recommender system could store data about the impact of various types of products within the given product family on various hair or skin types.

The efficacy determination and recommendations can be varied based on seasonal, regional, and/or individual variations specific to the user. For example, depending on the FMCG product, it is possible that the local weather conditions (e.g., rain and humidity levels) have an impact on the efficacy of the product, in addition to the product itself. For instance, in the case of shampoo, increased exposure to rain might lead to an accelerated decay of the effect of the shampoo, hence resulting in a need to increase the cycle at which the given product is applied.

To account for such variability, the efficacy analysis process as well as FMCG product application instructions could be augmented with extra information about seasonal and regional variations. Such information could comprise, e.g., preinstalled information about rainfall levels in various regions of the world across the months of the year. It is also possible to feed live data about weather conditions to the service based on a location of the mobile device (e.g., as determine using GPS technology, cell phone triangulation, or other location determining methods or devices), in which case the analysis would yield a higher accuracy level.

Individual differences could also interact with the active agents of the FMCG products. For instance, it is conceivable that the effect of a shampoo will reduce relatively fast for individuals who are physically active or outdoors. Physical activity level could be automatically detected with the help of the mobile device, through the use of GPS and accelerometer data. Alternatively, this information could also be directly obtained from another application, such as Nokia SportsTracker™ or Wellness Diary™, or by manual entry of the user.

Across the examples above, information about, for example, recent weather and activity level of the user will yield a more reliable estimate of the effect of the FMCG product, as it leads to more complete knowledge about the values of other relevant parameters.

The outcome of the measurement process can be used in various ways, in addition to communicating about the effect to the user. For instance, the user may be interested in publishing the results on a social networking service. It is also possible to form communities of consumers with similar profiles by correlating performance of the FMCG product across the population. For instance, if Shampoo X has effect Y on certain consumers' hair, then a community can be formed for those diagnosed with effect Y, to provide a social forum for such customers to share suggestions, or for marketing to such groups, etc.

A final example of utilizing the output of the measurement process is related to feedback loop of the efficacy of the FMCG or nutritional product to the manufacturer of the given product. It is conceivable that such information is valuable to the manufacturer as it enables modifications to be made to the chemical composition of the FMCG product. It is also conceivable that competitors of the efficacy measurement would be interested in this kind of information. In any case, phone customers that provide such feedback to manufacturers could be provided with incentives, such as coupons, phone subsidies, free call time, etc. In the case a feedback loop of the efficacy of the FMCG product is created, a need arises to protect the privacy of the individual using the product. For instance, images revealing the face should be made anonymous.

The processes described herein for determining and applying privacy and/or security policies based on data and value may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
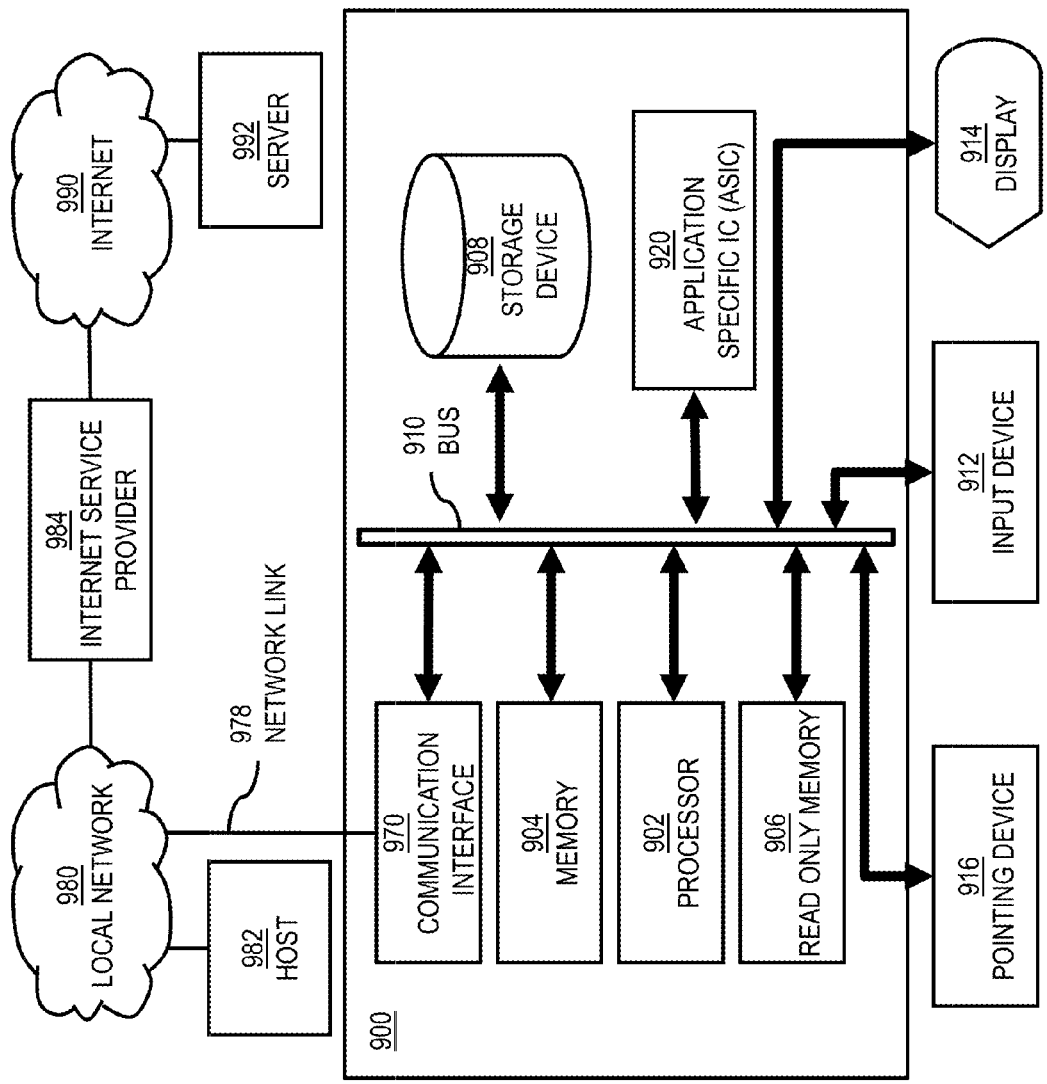
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine and apply privacy and/or security policies based on data and value as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining and applying privacy and/or security policies based on data and value.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determining and applying privacy and/or security policies based on data and value. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for determining and applying privacy and/or security policies based on data and value. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining and applying privacy and/or security policies based on data and value, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 113 for determining and applying privacy and/or security policies based on data and value.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine and apply privacy and/or security policies based on data and value as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining and applying privacy and/or security policies based on data and value.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine and apply privacy and/or security policies based on data and value. The memory 1005 also stores the data associated with or generated by the execution of the inventive steps.

Figure 11:
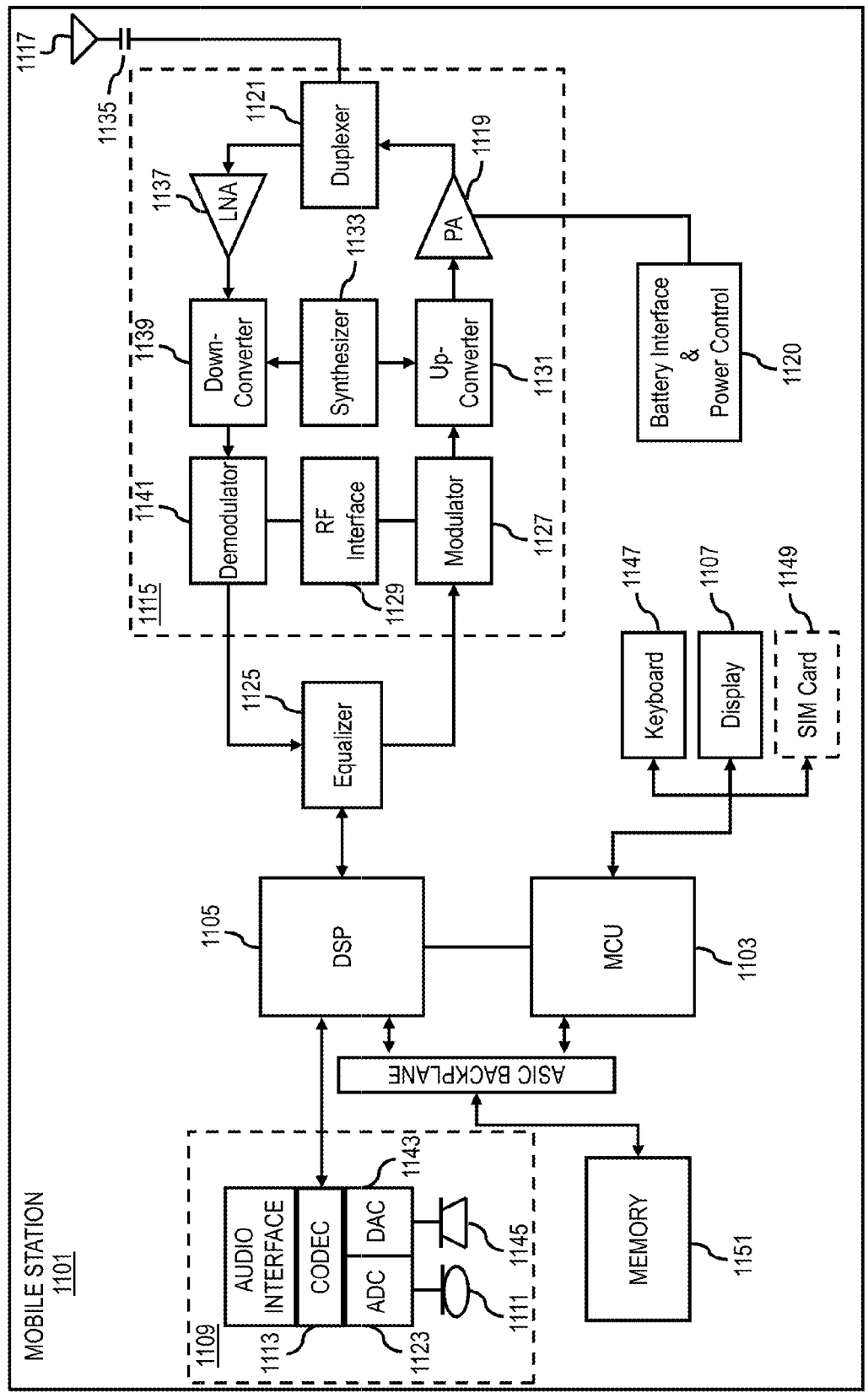
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of determining and applying privacy and/or security policies based on data and value. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining and applying privacy and/or security policies based on data and value. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine and apply privacy and/or security policies based on data and value. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining at least one value for at least one instance of data, wherein the data comprises biometric data measurements of a user derived from a biometric sensor signal and at least one test result associated with an efficacy test, wherein the at least one value comprises at least one actual measurement of the biometric data measurements;
    determining an efficacy estimation of a product for the user based upon an analysis of the at least one value and information about seasonal, regional, or individual variations specific to the user;
    determining at least one privacy policy, at least one security policy, or a combination thereof based, at least in part, on the determined efficacy estimation and one or more parameters for sharing the at least one instance of data and the determined at least one value with other users or entities;
    applying, using a processor, the at least one privacy policy, the at least one security policy, or a combination thereof with respect to the at least one instance of data; and
    initiating, using the processor, a sharing of the at least one instance of data to a social networking platform based, at least in part, on the applied at least one privacy policy, the at least one security policy, or a combination thereof.

2. A method of claim 1 further comprising:
    determining of contextual information associated with at least one owner, at least one recipient, at least one user, or a combination thereof of the at least one instance of data,
    wherein the at least one privacy policy, the at least one security policy, or a combination thereof is further based, at least in part, on the contextual information.

3. A method of claim 2, wherein the contextual information includes, at least in part, location information, and the location information including the location of the at least one user, the at least one recipient, the at least one instance of data, or a combination thereof.

4. A method of claim 1,
    wherein initiating the sharing comprises an anonymizing, a filtering, or a combination thereof of the at least one value, the at least one instance of data, related user information, related product information, or a combination thereof based, at least in part, on the at least one privacy policy, the at least one security policy, or a combination thereof.

5. A method of claim 1 further comprising:
    processing the at least one value against one or more criteria to cause, at least in part, a categorization of the at least one value,
    wherein (a) the at least one privacy policy, the at least one security policy, or a combination thereof; (b) the application of the at least one privacy policy, the at least one security policy, or a combination thereof; or (c) a combination is further based, at least in part, on the categorization.

6. A method of claim 1 further comprising:
    presenting the at least one privacy policy, the at least one security policy, or a combination thereof;
    determining an input for selecting, for confirming, or a combination thereof the at least one privacy policy, the at least on security policy, or a combination thereof; and
    initiating the application of the at least one privacy policy, the at least one security policy, or a combination thereof based, at least in part, on the input.

7. A method of claim 1 further comprising:
    determining to recommend the at least one privacy policy, the at least one security policy, or a combination thereof based, at least in part, on one or more products, one or more vendors of the one or more products, or a combination thereof associated with the at least one instance of data.

8. A method of claim 1 further comprising:
    generating a mapping of the at least one privacy policy, the at least one security policy, or a combination thereof to one or more potential values, one or more potential value ranges, or a combination thereof of the at least one instance of data; and determining the at least one privacy policy, the at least one security policy or a combination thereof based, at least in part, on a comparison of the at least one value to the mapping.

9. A method of claim 1 further comprising:
determining a recommended use of the product;
collecting data based on the recommended use of the product; and
determining the efficacy estimation of the product based on the collected data.

10. A method claim 1, wherein the one or more parameters are associated with the user, a location of the user, type of the data, one or more values associated with the data, recipient of the data, entity causing generation of the data, or a combination thereof.

11. An apparatus comprising:
at least one processor; and
at least one memory including computer program code for one or more programs,
the at least one memory and the computer program code configured to, with the at least one processor, cause the apparatus to perform at least the following:
determine at least one value for at least one instance of data, wherein the data comprises biometric data measurements of a user derived from a biometric sensor signal and at least one test result associated with an efficacy test, wherein the at least one value comprises at least one actual measurement of the biometric data measurements;
determine an efficacy estimation of a product for the user based upon an analysis of the at least one value and information about seasonal, regional, or individual variations specific to the user;
determine at least one privacy policy, at least one security policy, or a combination thereof based on, at least in part, the determined efficacy estimation and one or more parameters for sharing the at least one instance of data and the determined at least one value with other users or entities;
cause, at least in part, an application of the at least one privacy policy, the at least one security policy, or a combination thereof with respect to the at least one instance of data; and
cause, at least in part, an initiation of sharing of the at least one instance of data to a social networking platform based, at least in part, on the applied at least one privacy policy, the at least one security policy, or a combination thereof.

12. An apparatus of claim 11, wherein the apparatus is further caused to:
determine contextual information associated with at least one owner, at least one recipient, at least one user, or a combination thereof of the at least one instance of data,
wherein the at least one privacy policy, the at least one security policy, or a combination thereof is further based, at least in part, on the contextual information.

13. An apparatus of claim 12, wherein the contextual information includes, at least in part, location information, and the location information including the location of the at least one user, the at least one recipient, the at least one instance of data, or a combination thereof.

14. An apparatus of claim 11, wherein
the initiation of sharing comprises an anonymizing, a filtering, or a combination thereof of the at least one value, the at least one instance of data, related user information, related product information, or a combination thereof based, at least in part, on the at least one privacy policy, the at least one security policy, or a combination thereof.

15. An apparatus of claim 11, wherein the apparatus is further caused to:
process the at least one value against one or more criteria to cause, at least in part, a categorization of the at least one value,
wherein (a) the at least one privacy policy, the at least one security policy, or a combination thereof (b) the application of the at least one privacy policy, the at least one security policy, or a combination thereof; or (c) a combination is further based, at least in part, on the categorization.

16. An apparatus of claim 11, wherein the apparatus is further caused to:
cause, at least in part, a presentation of the at least one privacy policy, the at least one security policy, or a combination thereof;
determine an input for selecting, for confirming, or a combination thereof the at least one privacy policy, the at least on security policy, or a combination thereof; and
cause, at least in part, an initiation of the application of the at least one privacy policy, the at least one security policy, or a combination thereof based, at least in part, on the input.

17. An apparatus of claim 11, wherein the apparatus is further caused to:
determine to recommend the at least one privacy policy, the at least one security policy, or a combination thereof based, at least in part, on one or more products, one or more vendors of the one or more products, or a combination thereof associated with the at least one instance of data.

18. An apparatus of claim 11, wherein the apparatus is further caused to:
cause, at least in part, a generation of a mapping of the at least one privacy policy, the at least one security policy, or a combination thereof to one or more potential values, one or more potential value ranges, or a combination thereof of the at least one instance of data; and
determine the at least one privacy policy, the at least one security policy or a combination thereof based, at least in part, on a comparison of the at least one value to the mapping.

19. An apparatus of claim 11, wherein the apparatus is further caused to:
determine a recommended use of the product;
collect data based on the recommended use of the product; and
determine the efficacy estimation of the product based on the collected data.

20. A computer program product comprising at least one non-transitory computer-readable storage medium having computer-executable program code portions stored therein, the computer-executable program code portions comprising program code instructions for:
determining at least one value for at least one instance of data, wherein the data comprises biometric data measurements of a user derived from a biometric sensor signal and at least one test result associated with an efficacy test, wherein the at least one value comprises at least one actual measurement of the biometric data measurements;
determining an efficacy estimation of a product for the user based upon an analysis of the at least one value and information about seasonal, regional, or individual variations specific to the user;

determining at least one privacy policy, at least one security policy, or a combination thereof based, at least in part, on the determined efficacy estimation and one or more parameters for sharing the at least one instance of data and the determined at least one value with other users or entities;

applying the at least one privacy policy, the at least one security policy, or a combination thereof with respect to the at least one instance of data; and initiating a sharing of the at least one instance of data to a social networking platform based, at least in part, on the applied at least one privacy policy, the at least one security policy, or a combination thereof.

* * * * *